(12) United States Patent
Ishikawa

(10) Patent No.: US 7,054,503 B2
(45) Date of Patent: May 30, 2006

(54) IMAGE PROCESSING SYSTEM, IMAGE PROCESSING METHOD, AND IMAGE PROCESSING PROGRAM

(75) Inventor: Masaki Ishikawa, Kunitachi (JP)

(73) Assignee: Seiko Epson Corporation, Tokyo (JP)

( * ) Notice: Subject to any disclaimer, the term of this patent is extended or adjusted under 35 U.S.C. 154(b) by 757 days.

(21) Appl. No.: 10/257,860

(22) PCT Filed: Feb. 25, 2002

(86) PCT No.: PCT/JP02/01651

§ 371 (c)(1),
(2), (4) Date: Oct. 18, 2002

(87) PCT Pub. No.: WO02/067589

PCT Pub. Date: Aug. 29, 2002

(65) Prior Publication Data

US 2003/0138160 A1    Jul. 24, 2003

(30) Foreign Application Priority Data

Feb. 23, 2001 (JP) ............................... 2001-49218
Mar. 27, 2001 (JP) ............................... 2001-91063

(51) Int. Cl.
*G60K 9/40* (2006.01)

(52) U.S. Cl. ..................... 382/275; 382/260; 358/3.26; 358/3.27

(58) Field of Classification Search ................ 382/260, 382/274; 358/2.26, 3.28, 463
See application file for complete search history.

(56) References Cited

U.S. PATENT DOCUMENTS 6,188,799 B1    2/2001  Tan et al.
6,240,135 B1    5/2001  Kim

FOREIGN PATENT DOCUMENTS

JP          A 3-46482         2/1991
JP          A 11-098505       4/1999
JP          A 2001-160970     6/2001

*Primary Examiner*—Samir Ahmed
*Assistant Examiner*—Yosef Kassa
(74) *Attorney, Agent, or Firm*—Oliff & Berridge, PLC

(57) ABSTRACT

In the present invention, 2N pixels (having signal levels $V_1$ through $V_8$), including a boundary pixel, that consist of N pixels on each side of a boundary and run orthogonally to the boundary are referenced to determine whether correction should be performed or not. If it is determined that the correction should be performed, the boundary pixel and M pixels on each side of the boundary pixel are used to perform the correction. In an image processing system for performing filtering on pixels belonging to a block, which is a unit of discrete cosine transform in image compression, the maximum value of differences between neighboring pixels in at least half, including a pixel of interest, of all the pixels composing a block to be processed is obtained. Differences between neighboring pixels in 2N pixels, including the pixel of interest, that run orthogonally to the boundary between blocks and consist of N pixels on each side of the boundary are calculated. The differences calculated are compared with a threshold corresponding to the maximum value to determine whether filtering should be performed. If it is determined that filtering should be performed, the pixel of interest and M pixels on each side of the pixel of interest are used to perform filtering. N is a positive integer and M is a positive integer smaller than N.

61 Claims, 9 Drawing Sheets

*FIG. 11 (a)*  *FIG. 11 (b)*
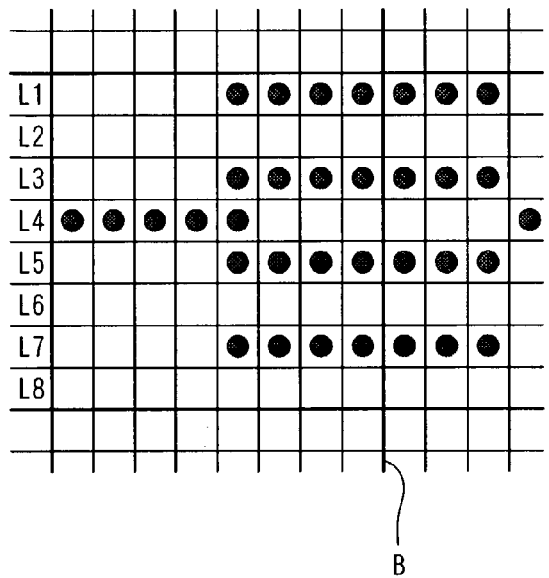
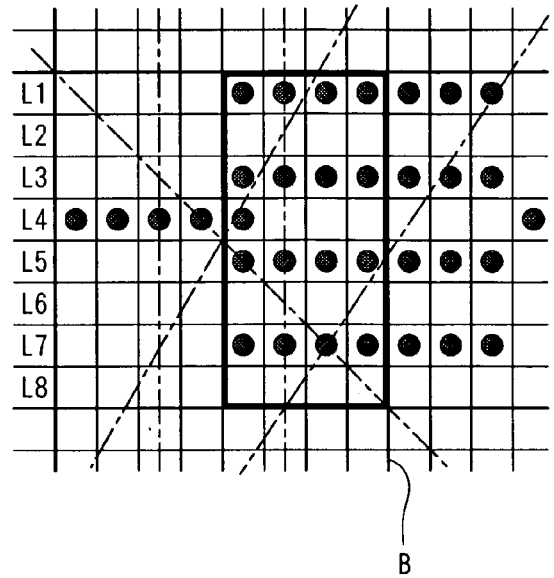
*FIG. 12*
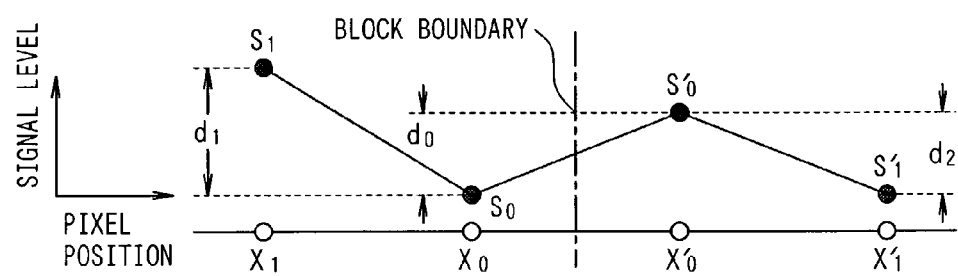

IMAGE PROCESSING SYSTEM, IMAGE PROCESSING METHOD, AND IMAGE PROCESSING PROGRAM

TECHNICAL FIELD

The present invention relates to an image processing system, image processing method, and image processing program.

BACKGROUND ART

JPEG (Joint Photographic Experts Group) compression, which is as till image compression technology, and MPEG (Moving Picture Experts Group) compression, which is a motion picture compression technology, are widely known. These image compression technologies treat an 8×8-pixel block as a processing unit to perform the well-known Discrete Cosine Transform (hereinafter referred to as DCT). The DCT is a process for separating an image into spatial frequency components that can reduce spatially redundant information to compress that image.

When JPEG or MPEG technology is used, two types of noise, which will be described below, are generated, degrading image quality. In the JPEG and MPEG technologies, an 8×8-pixel block is treated as a processing unit. The boundaries of these blocks are perceived by a user as noise. The boundary noise is called block noise.

DCT in the JPEG and MPEG techniques removes high frequency components as redundant information. As a result, noise appears in regions where there is a large difference in luminance between a boundary and the surrounding region. For example, if there are fluctuations in luminance in a block, as in a case where a block contains a character against a natural picture, hazy noise appears at the boundary of the character because DCT removes high frequency components from data constituting the true boundary of the character. This noise is called mosquito noise.

Known techniques for reducing such block noise include Verification Model (hereinafter abbreviated to VM) and a technique described in Japanese Patent Laid-Open No. 11-98505. In the technique described in the Japanese Patent Laid-Open No. 11-98505, it is determined which of default mode and DC offset mode is used for vertical and horizontal block boundaries shown in FIG. 13 and a process is performed.

In this case, pixel sets S0, S1, and S2 are defined using block boundaries B1 and B2 as the base points and one of the default mode and DC offset mode is selected as deblocking mode based on block distortion level of a mode determination value. If the default mode is selected, a 4-point DCT kernel is used to obtain information about frequencies around the block boundary for each pixel. If DC offset mode is selected in the mode determination step, it is determined whether execution of DC offset mode is required or not. If it is required, block distortion is removed in regions where the motion of the image is slow.

In addition, the VM includes filtering for removing mosquito noise. The filtering involves a process for obtaining maximum and minimum values within the block, thresholding for all pixels, and determination whether mosquito noise reduction should be performed or not.

A technique for reducing such noise as described above is described in Japanese Patent Laid-Open No. 3-46482. In the technique described in the document, filtering is performed if a difference in signal levels between two pixels adjacent to a boundary is greater than a first threshold and a difference in signal levels between a pixel adjacent to the boundary and a pixel neighboring that pixel in the same block among pixels on the row is smaller than a second threshold, filtering is performed.

In FIG. 12, the signal levels at pixel positions X0 and X'0 are corrected based on difference values d0, d1, and d2 between signal levels $S_1$, $S_0$, $S'_0$, and $S'_1$ at pixel positions X1 and X0 and pixel positions X'0 and X'1 that are located on either side of a block boundary. Signal levels $S_{0\text{-}new}$ and $S'_{0\text{-}new}$ will be as follows.

$$S_{0\text{-}new}=(S_1+2\cdot S_0+S'_0)/4$$

$$S'_{0\text{-}new}=(S_0+2\cdot S'_0+S'_1)/4$$

However, the technique described in Japanese Patent Laid-Open No. 3-46482 is insufficient for removing block distortion because it makes a correction to boundary pixels only. The VM and the technique described in Japanese Patent Laid-Open No. 11-98505 also have a short coming that the process is complex and therefore involves a too high computational load.

Several studies and experiments have shown the following facts. First, it is insufficient that only one or two pixels at a block boundary are corrected by filtering. At least three pixels should be corrected. In addition, it is difficult to discriminate between mosquito noise around edges and high-frequency-component features of an image. Furthermore, determination using block boundary pixels alone can detect block distortion but cannot properly determine which of a broadband filter and a narrow band filter should be used. Broadband filtering should not be applied to a block containing a strong edge.

The present invention has been made to solve these problems with the prior art. An object of the present invention is to provide an image processing system, method, and program that can reduce the above-described noise by a simpler process.

DISCLOSURE OF THE INVENTION

An image processing system according to the present invention is an image processing system for performing filtering on a boundary pixel at the boundary between neighboring blocks, the block being a unit of discrete cosine transform in image compression, the image processing system being characterized by comprising: determination means for referencing 2N pixels, including the boundary pixel, that consist of N pixels on each side of the boundary and run orthogonally to the boundary to determine whether correction should be performed, where N is an integer between 3 and 5 inclusive; the same applies to the following description; and correction means for performing correction by using the boundary pixel and each set of M pixels on each side of the boundary pixel if the determination means determines that correction should be performed, where M is an integer smaller than N; the same applies to the following description.

It is also characterized in that the determination means obtains differences between neighboring pixels in the 2N pixels referenced and, if all the differences obtained are smaller than a threshold that is determined based on a quantized value for the image, determines that the correction should be performed.

It is also characterized in that the determination means obtains differences between neighboring pixels in the 2N pixels referenced, the neighboring pixels being at least one pixel apart from each other, and, if all of the differences obtained are smaller than a threshold that is determined based on a quantized value for the image, determines that the correction should be performed.

It is also characterized in that the threshold is the quantized value plus an integer between 2 and 10 inclusive if the quantized value is equal to or less than 30.

It is also characterized in that the determination means determines that the correction should not be performed if all of the differences between neighboring pixels in the 2N pixels referenced are zero or only one of the differences is nonzero.

It is also characterized in that the determination means obtains differences between neighboring pixels in the 2N pixels referenced, and, if any of the differences obtained is smaller than a threshold that is determined based on a quantized value for the image, determines that the correction should be performed.

It is also characterized in that the correction by the correction means is made to the boundary pixel according to a value obtained by multiplying the boundary pixel and each of 2M pixels on both sides of the boundary pixel by one of predetermined coefficients and dividing the product by the sum of the coefficients.

It is also characterized in that the predetermined coefficient for the boundary pixel is larger than the coefficients for the other pixels.

It is also characterized in that filtering is performed on one of a horizontal line and a vertical line in the block to which filtering is applied and thereafter filtering is performed on the other of the horizontal line and the vertical line.

It is also characterized in that the image processing system comprises storage means for storing each set of four pixels on each side of each of the horizontal and vertical boundaries, the each set of four pixels running from the intersection of the horizontal and vertical boundaries, wherein predetermined pixels contained in the block are sequentially stored in the storage means and the determination means and the correction means process the 8×8 pixels stored in the storage means.

Thus, storage capacity required for storing pixels during filtering can be reduced.

An image processing method according to the present invention is an image processing method for performing filtering on a boundary pixel at the boundary between neighboring blocks, the block being a unit of discrete cosine transform in image compression, the image processing method being characterized by comprising: the determination step of referencing 2N pixels, including the boundary pixel, that consist of N pixels on each side of the boundary and run orthogonally to the boundary to determine whether correction should be performed, where N is an integer between 3 and 5 inclusive; the same applies to the following description; and the correction step of performing correction by using the boundary pixel and each set of M pixels on each side of the boundary pixel, if the determination step determines that correction should be performed, where M is an integer smaller than N; the same applies to the following description.

It is also characterized in that the determination step obtains differences between neighboring pixels in the 2N pixels referenced and, if all the differences obtained are smaller than a threshold that is determined based on a quantized value for the image, determines that the correction should be performed.

It is also characterized in that the determination step obtains differences between neighboring pixels in the 2N pixels referenced, the neighboring pixels being at least one pixel apart from each other, and, if all of the differences obtained are smaller than a threshold that is determined based on a quantized value for the image, determines that the correction should be performed.

It is also characterized in that the threshold is the quantized value plus an integer between 2 and 10 inclusive if the quantized value is equal to or less than 30.

It is also characterized in that the determination step determines that the correction should not be performed if all of the differences between neighboring pixels in the 2N pixels referenced are zero or only one of the differences is nonzero.

It is also characterized in that the determination step obtains differences between neighboring pixels in the 2N pixels referenced, and, if any of the differences obtained is smaller than a threshold that is determined based on a quantized value for the image, determines that the correction should be performed.

It is also characterized in that the correction at the correction step is made to the boundary pixel according to a value obtained by multiplying the boundary pixel and each of 2M pixels on both sides of the boundary pixel by one of predetermined coefficients and dividing the product by the sum of the coefficients.

It is also characterized in that the predetermined coefficient for the boundary pixel is larger than the coefficients for the other pixels.

It is also characterized in that filtering is performed on one of a horizontal line and a vertical line in the block to which filtering is applied and thereafter filtering is performed on the other of the horizontal line and the vertical line.

It is also characterized in that each set of four pixels on each side of each of the horizontal and vertical boundaries in the block is stored, the each set of four pixels running from the intersection of the horizontal and vertical boundaries, and the determination step and the correction step process the stored 8×8 pixels.

An image processing program according to the present invention is an image processing program for performing filtering on a boundary pixel at the boundary between neighboring blocks, the block being a unit of discrete cosine transform in image compression, the image processing program being characterized by comprising: the determination step of referencing 2N pixels, including the boundary pixel, that consist of N pixels on each side of the boundary and run orthogonally to the boundary to determine whether correction should be performed, where N is an integer between 3 and 5 inclusive; the same applies to the following description; and the correction step of performing correction by using the boundary pixel and each set of M pixels on each side of the boundary pixel if the determination step determines that correction should be performed, where M is an integer smaller than N; the same applies to the following description.

It is also characterized in that the determination step obtains differences between neighboring pixels in the 2N pixels referenced and, if all the differences obtained are smaller than a threshold that is determined based on a quantized value for the image, determines that the correction should be performed.

It is also characterized in that the determination step obtains differences between neighboring pixels in the 2N pixels referenced, the neighboring pixels being at least one pixel apart from each other, and, if all of the differences obtained are smaller than a threshold that is determined based on a quantized value for the image, determines that the correction should be performed.

It is also characterized in that the threshold is the quantized value plus an integer between 2 and 10 inclusive if the quantized value is equal to or less than 30.

It is also characterized in that the determination step determines that the correction should not be performed if all of the differences between neighboring pixels in the 2N pixels referenced are zero or only one of the differences is nonzero.

It is also characterized in that the determination step obtains differences between neighboring pixels in the 2N pixels referenced, and, if any of the differences obtained is smaller than a threshold that is determined based on a quantized value for the image, determines that the correction should be performed.

It is also characterized in that the correction at the correction step is made to the boundary pixel according to a value obtained by multiplying the boundary pixel and each of 2M pixels on both sides of the boundary pixel by one of predetermined coefficients and dividing the product by the sum of the coefficients.

It is also characterized in that the predetermined coefficient for the boundary pixel is larger than the coefficients for the other pixels.

It is also characterized in that filtering is performed on one of a horizontal line and a vertical line in the block to which filtering is applied and thereafter filtering is performed on the other of the horizontal line and the vertical line.

It is also characterized in that each set of four pixels on each side of each of the horizontal and vertical boundaries in the block is stored, the each set of four pixels running from the intersection of the horizontal and vertical boundaries, and the determination step and the correction step process the stored 8×8 pixels.

In effect, according to the present invention, 2N pixels consisting of N pixels on each side of a boundary are referenced and, if the image should be corrected, boundary pixels and each set of M pixels on each side of the boundary pixels are used. The values of N and M are set appropriately to reduce the noise described earlier.

An image processing system according to the present invention is an image processing system for performing filtering on pixels belonging to a block which is a unit of discrete cosine transform in image compression, the image processing system being characterized by comprising: maximum value finding means capable of finding the maximum value of differences between neighboring pixels in at least half of all pixels composing a block to be processed, the half including a pixel of interest; difference calculation means for calculating differences between neighboring pixels in 2N pixels, including the pixel of interest, that consist of N pixels on each side of the boundary between the block and another block and run orthogonally to the boundary, where N is a positive integer; the same applies to the following description; determination means for comparing the differences obtained by the difference calculation means with a threshold corresponding to the maximum value to determine whether filtering should be performed; and filtering means for performing filtering by using the pixel of interest and each set of M pixels on each side of the pixel of interest if the determination means determines that filtering should be performed, where M is a positive integer smaller than N; the same applies to the following description.

It is also characterized in that the difference calculation means calculates differences between neighboring pixels in 2N pixels referenced; and the determination means determines that the filtering should be performed if all the differences obtained by the difference calculation means are smaller than the threshold.

It is also characterized in that the difference calculation means calculates differences between neighboring pixels in the 2N pixels referenced, the neighboring pixels being at least one pixel apart from each other, and, if all of the differences obtained by the difference calculation means are smaller than a threshold that is determined based on a quantized value for the image, the determination means determines that the filtering should be performed.

It is also characterized in that the determination means determines that predetermined filtering differing from the above-mentioned filtering should be performed if all of the differences are not smaller than the threshold and a difference between neighboring pixels in the M pixels is smaller than a predetermined threshold.

It is also characterized in that the determination means determines the threshold according to the maximum value.

It is also characterized in that the determination means sets a higher threshold for pixels at a boundary of the block to be processed than a threshold for pixels within the block to be processed.

It is also characterized in that the filtering means makes correction to the pixel of interest according to a value obtained by multiplying the pixel of interest and each of a plurality of pixels on each side of the pixel of interest by one of predetermined coefficients and dividing the product by the sum of the coefficients.

It is also characterized in that the maximum value finding means searches pixels to be searched on every other line for the maximum value.

It is also characterized in that filtering is performed on one of a horizontal line and a vertical line in the block to which filtering is applied and thereafter filtering is performed on the other of the horizontal line and the vertical line.

It is also characterized in that the image processing system comprises:

storage means for storing each set of four pixels on each side of each of the horizontal and vertical boundaries, the each set of four pixels running from the intersection of the horizontal and vertical boundaries; and tentative-maximum-value obtaining means for calculating differences between the neighboring pixels in 8×8 pixels stored in the storage means to obtain a tentative maximum value that is the maximum value of the differences between pixels in each set of 4×4 pixels separated by the boundary; wherein the maximum value finding means determines as the maximum value the maximum one of all tentative maximum values in the block if the tentative maximum values in the entire block have already been obtained, or determines as the maximum value the maximum one of tentative maximum values obtained if not all of the tentative maximum values in the entire block have been obtained, and the difference calculation means and the filtering means process the 8×8 pixels stored in the storage means.

According to the present invention, storage capacity required for storing pixels during filtering can be reduced.

It is also characterized in that the image processing system comprises: storage means for storing each set of four pixels on each side of the vertical boundary and four pixels located above the horizontal boundary and eight pixels located below the horizontal boundary running from the intersection of the horizontal and vertical boundaries tentative-maximum-value obtaining means for calculating differences between the neighboring pixels in 8×12 pixels stored in the storage means to obtain a tentative maximum value that is the maximum one of differences between pixels in a set of 4×4 pixels, the set being a unit provided by dividing the 8×12 pixels into two rows and three lines; wherein the maximum value finding means determines as the maximum value the maximum one of all tentative maximum values in the block if tentative maximum values in the entire block have already been obtained, or determines as the maximum value the maximum one of tentative maximum values obtained if not all of the tentative maximum values in the entire block have been obtained; and the difference calculation means and the filtering means process the upper 8×8 pixels in the 8×12 pixels stored in the storage means.

An image processing method according to the present invention is an image processing method for performing filtering on pixels belonging to a block which is a unit of discrete cosine transform in image compression, characterized in that it comprises: the maximum value finding step of finding the maximum value of differences between neighboring pixels in at least half of all pixels composing a block to be processed, the half including a pixel of interest; the difference calculation step of calculating differences between neighboring pixels in 2N pixels, including the pixel of interest, that consist of N pixels on each side of the boundary between the block and another block and run orthogonally to the boundary, where N is a positive integer; the same applies to the following description; the determination step of comparing the differences obtained at the difference calculation step with a threshold corresponding to the maximum value to determine whether filtering should be performed; and the filtering step of performing filtering by using the pixel of interest and each set of M pixels on each side of the pixel of interest if the determination step determines that filtering should be performed, where M is a positive integer smaller than N; the same applies to the following description.

It is also characterized in that the difference calculation step calculates differences between neighboring pixels in 2N pixels referenced; and the determination step determines that the filtering should be performed if all the differences obtained at the difference calculation step are smaller than the threshold.

It is also characterized in that the difference calculation step calculates differences between neighboring pixels in the 2N pixels referenced, the neighboring pixels being at least one pixel apart from each other, and, if all of the differences obtained at the difference calculation step are smaller than a threshold that is determined based on a quantized value for the image, the determination step determines that the filtering should be performed.

It is also characterized in that the determination step determines that predetermined filtering differing from the above-mentioned filtering should be performed if all of the differences are not smaller than the threshold and a difference between neighboring pixels in the M pixels is smaller than a predetermined threshold.

It is also characterized in that the determination step determines the threshold according to the maximum value.

It is also characterized in that the determination step sets a higher threshold for pixels at a boundary of the block to be processed than a threshold for pixels within the block to be processed.

It is also characterized in that the filtering step makes correction to the pixel of interest according to a value obtained by multiplying the pixel of interest and each of a plurality of pixels on each side of the pixel of interest by one of predetermined coefficients and dividing the product by the sum of the coefficients.

It is also characterized in that the maximum value finding step searches pixels to be searched on every other line for the maximum value.

It is also characterized in that filtering is performed on one of a horizontal line and a vertical line in the block to which filtering is applied and thereafter filtering is performed on the other of the horizontal line and the vertical line.

It is also characterized in that the image processing method comprises: the tentative-maximum-value obtaining step of storing each set of four pixels on each side of each of the horizontal and vertical boundaries, the each set of four pixels running from the intersection of the horizontal and vertical boundaries and calculating differences between the neighboring pixels in 8×8 pixels stored to obtain a tentative maximum value that is the maximum value of the differences between pixels in each set of 4×4 pixels separated by the boundary; wherein the maximum one of all tentative maximum values in the block is determined as the maximum value at the maximum value finding step if the tentative maximum values in the entire block have already been obtained, or the maximum one of tentative maximum values obtained is determined as the maximum value if not all of the tentative maximum values in the entire block have been obtained; and the difference calculation step and the filtering step process the stored 8×8 pixels.

It is also characterized in that the image processing method comprises: the tentative-maximum-value obtaining step of storing each set of four pixels on each side of the vertical boundary and four pixels located above the horizontal boundary and eight pixels located below the horizontal boundary running from the intersection of the horizontal and vertical boundaries and calculating differences between the neighboring pixels in 8×12 pixels stored to obtain a tentative maximum value that is the maximum one of differences between pixels in a set of 4×4 pixels, the set being a unit provided by dividing the 8×12 pixels into two rows and three lines; wherein the maximum value finding step determines as the maximum value the maximum one of all tentative maximum values in the block if tentative maximum values in the entire block have already been obtained, or determines as the maximum value the maximum one of tentative maximum values obtained if not all of the tentative maximum values in the entire block have been obtained; and the difference calculation step and the filtering step process the upper 8×8 pixels in the stored 8×12 pixels.

An image processing program according to the present invention is an image processing program for performing filtering on pixels belonging to a block which is a unit of discrete cosine transform in image compression, characterized in that it comprises: the maximum value finding step of finding the maximum value of differences between neighboring pixels in at least half of all pixels composing a block to be processed, the half including a pixel of interest; the difference calculation step of calculating differences between neighboring pixels in 2N pixels, including the pixel of interest, that consist of N pixels on each side of the boundary between the block and another block and run orthogonally to the boundary, where N is a positive integer; the same applies to the following description; the determination step of comparing the differences obtained at the difference calculation step with a threshold corresponding to the maximum value to determine whether filtering should be performed; and the filtering step of performing filtering by using the pixel of interest and each set of M pixels on each side of the pixel of interest if the determination step determines that filtering should be performed, where M is a positive integer smaller than N; the same applies to the following description.

It is also characterized in that the difference calculation step calculates differences between neighboring pixels in 2N pixels referenced; and the determination step determines that the filtering should be performed if all the differences obtained at the difference calculation step are smaller than the threshold.

It is also characterized in that the difference calculation step calculates differences between neighboring pixels in the 2N pixels referenced, the neighboring pixels being at least one pixel apart from each other, and, if all of the differences obtained at the difference calculation step are smaller than a threshold that is determined based on a quantized value for the image, the determination step determines that the filtering should be performed.

It is also characterized in that the determination step determines that predetermined filtering differing from the above-mentioned filtering should be performed if all of the differences are not smaller than the threshold and a difference between neighboring pixels in the M pixels is smaller than a predetermined threshold.

It is also characterized in that the determination step determines the threshold according to the maximum value.

It is also characterized in that the determination step sets a higher threshold for pixels at a boundary of the block to be processed than a threshold for pixels within the block to be processed.

It is also characterized in that the filtering step makes correction to the pixel of interest according to a value obtained by multiplying the pixel of interest and each of a plurality of pixels on each side of the pixel of interest by one of predetermined coefficients and dividing the product by the sum of the coefficients.

It is also characterized in that the maximum value finding step searches pixels to be searched on every other line for the maximum value.

It is also characterized in that filtering is performed on one of a horizontal line and a vertical line in the block to which filtering is applied and thereafter filtering is performed on the other of the horizontal line and the vertical line.

It is also characterized in that the image processing program comprises: the tentative-maximum-value obtaining step of storing each set of four pixels on each side of each of the horizontal and vertical boundaries, the each set of four pixels running from the intersection of the horizontal and vertical boundaries and calculating differences between the neighboring pixels in 8×8 pixels stored to obtain a tentative maximum value that is the maximum value of the differences between pixels in each set of 4×4 pixels separated by the boundary; wherein the maximum one of all tentative maximum values in the block is determined as the maximum value at the maximum value finding step if the tentative maximum values in the entire block have already been obtained, or the maximum one of tentative maximum values obtained is determined as the maximum value if not all of the tentative maximum values in the entire block have been obtained; and the difference calculation step and the filtering step process the stored 8×8 pixels.

It is also characterized in that the image processing program comprises: the tentative-maximum-value obtaining step of storing each set of four pixels on each side of the vertical boundary and four pixels located above the horizontal boundary and eight pixels located below the horizontal boundary running from the intersection of the horizontal and vertical boundaries and calculating differences between the neighboring pixels in 8×12 pixels stored to obtain a tentative maximum value that is the maximum one of differences between pixels in a set of 4×4 pixels, the set being a unit provided by dividing the 8×12 pixels into two rows and three lines; wherein the maximum value finding step determines as the maximum value the maximum one of all tentative maximum values in the block if tentative maximum values in the entire block have already been obtained, or determines as the maximum value the maximum one of tentative maximum values obtained if not all of the tentative maximum values in the entire block have been obtained; and the difference calculation step and the filtering step process the upper 8×8 pixels in the stored 8×12 pixels.

Mosquito noise is notable in a region adjacent to a strong edge. Therefore, mosquito noise can be reduced by changing the evaluation values for turning on/off filtering according to the approximate size of an edge contained in a block. Edge extraction is performed only on neighboring pixels in order to use a process using neighborhood difference values. In addition, the maximum values of difference between neighboring pixels in at least half, including boundary pixels, of all the pixels composing a block to be processed is obtained in order to facilitate the process and to reduce the influence of an error in determination. All the pixels in the center of the block are used for edge extraction in order to address edges that run only in the horizontal and vertical directions and do not contain oblique components.

BRIEF DESCRIPTION OF THE DRAWINGS

FIGS. 11(a) and 11(b) shows a range in which a maximum value is searched for.

FIG. 12 shows filtering performed by an image processing system according to the prior art.

BEST MODE FOR CARRYING OUT THE INVENTION

Figure 1:
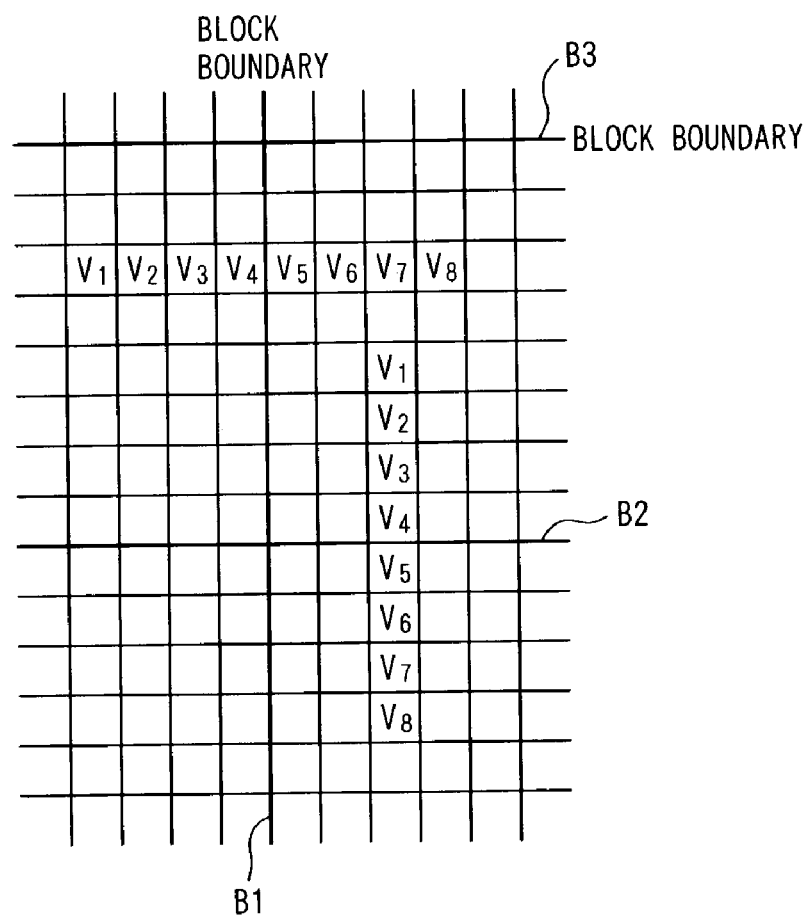
FIG. 1 shows a positional relationship between blocks and pixels to be referenced in an image to be processed by an image processing system according to the present invention.

Embodiments of an image processing system according to the present invention will be described below with respect to the accompanying drawings.

A first embodiment of the present invention will be described first.

Like parts are labeled with like reference numerals in the drawings referenced in the following description.

Figure 2:
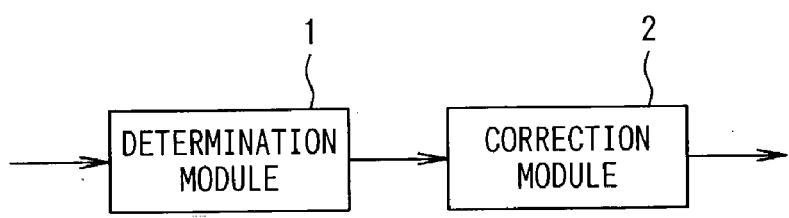
FIG. 2 is a block diagram showing a configuration of the image processing system according to the present invention.

FIG. 2 shows a block diagram of the embodiment of the image processing system according to the present invention. As shown, the image processing system according to the present invention comprises a determination module 1 for referencing 2N pixels, including a pixel on the boundary, consist of N pixels on each side of a boundary and run orthogonally to that boundary, and determining whether correction should be performed; and a correction module 2 for using each set of M pixels on each side of the boundary to perform correction if the determination module 1 determines that correction should be performed, where N is an integer between 3 and 5 inclusive and M is an integer smaller than N.

Figure 3:
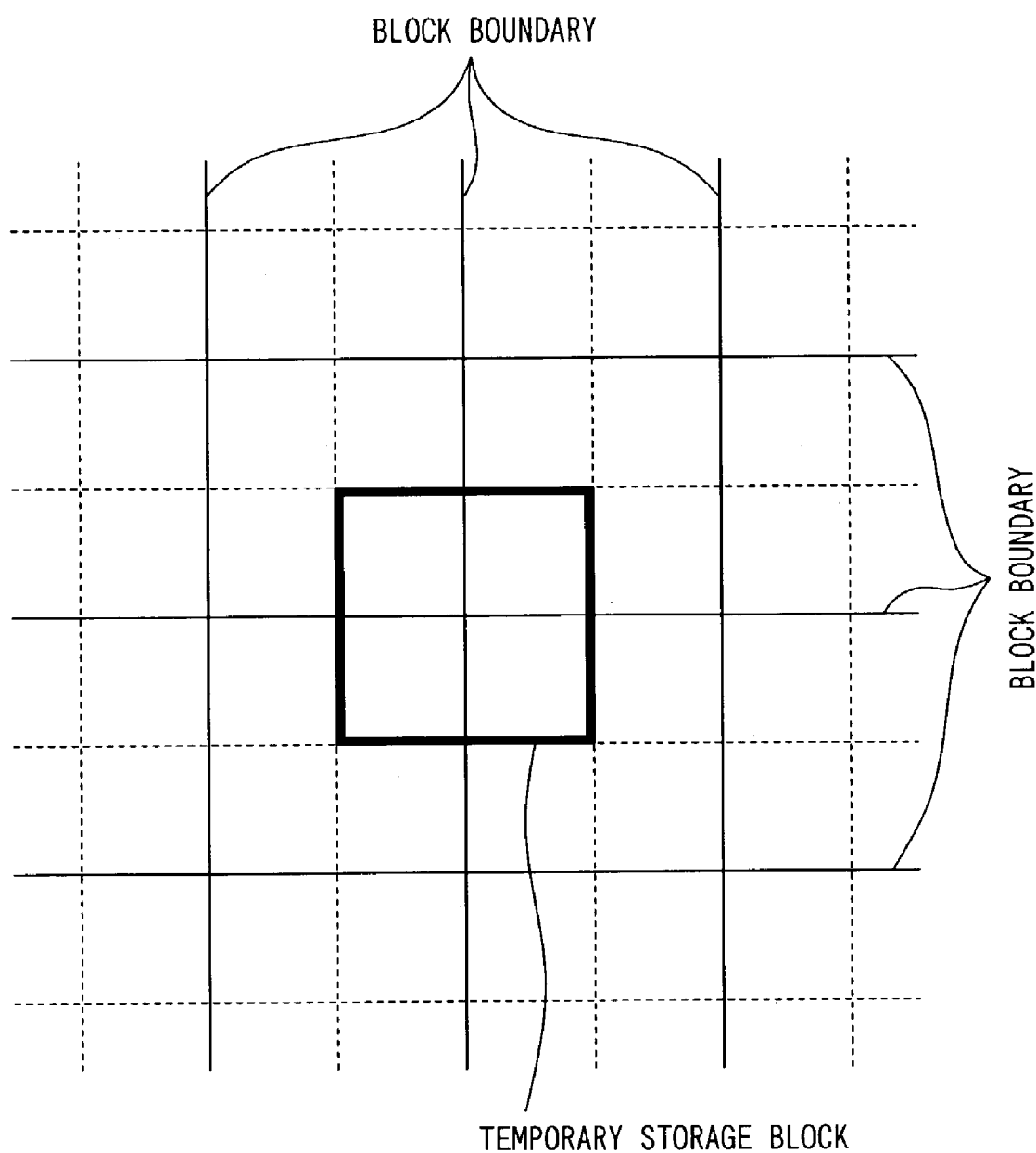
FIG. 3 shows a concept of a temporary storage block.

A buffer may be provided for temporarily holding a block to which filtering is to be applied. For example, if four pixels on each side (8 pixels on both sides) of the block boundary shown in FIG. 1 are referenced, 8×8 pixels including the block boundary (hereinafter called "temporary storage block" as appropriate), rather than entire frame to be processed, can be temporarily held to adequately perform correction and filtering. FIG. 3 shows the concept of a temporary storage block.

In this way, a temporary storage block of a predetermined size that includes a boundary and to which filtering is applied is held and then it is determined whether correction should be applied to it. As a result, storage capacity can be saved.

At the ends of a frame, there are pixels only on one side of the boundary and therefore the number of pixels is less than 8×8 pixels. The pixels on that side may be flipped over along the boundary to complete the temporary storage block, or predetermined dummy pixels that do not affect the filtering may be used to complete the temporary storage block.

In this example, the determination module 1 references four pixels on each side of the block boundary shown in FIG. 1. That is, it references signal level values $v_1$ through $v_8$. It then obtains differences between neighboring pixels in the 2N (8 in this example) pixels referenced and, if all the differences obtained are less than a predetermined threshold, which is determined based on a quantized value for the image, determines that correction should be performed.

The correction module 2 multiplies the signal level of each boundary pixel and the signal level of each of 2M (6 in this example) pixels by a predetermined coefficient. It then divides the product by the sum of the coefficients. It makes correction to the signal level of a boundary pixel according to the quotient. The coefficients by which pixels are multiplied are chosen so that the signal levels of a boundary pixel become larger than the signal levels of the other pixels.

In this example, the process is first applied to all the pixels at the vertical block boundary B1 (the pixels running orthogonally to the block boundary B1 are referenced), then to all the pixels at the horizontal block boundary B2 (the pixels running orthogonally to the block boundary B2 are referenced). Alternatively, the process may be first applied to all the pixels at the horizontal block boundary B2, then to all the pixels at the vertical block boundary B1.

Image processing is applied to each of luminance signal (Y) and chrominance difference signal (U, V) images.

The processing will be further described below. In this example, four pixels on each side of a block boundary are referenced as shown in FIG. 1. That is, the signal levels $v_1$ through $v_8$ of the pixels in FIG. 1 are referenced. Differences between signal levels $v_1$ through $v_8$ of neighboring pixels are obtained. That is, difference values d1 through d7 are obtained as follows:

$d1=|v_1-v_2|$ $d2=|v_2-v_3|$ $d3=|v_3-v_4|$ $d4=|v_4-v_5|$ $d5=|v_5-v_6|$ $d6=|v_6-v_7|$ $d7=|v_7-v_8|.$

If all the absolute difference values obtained are smaller than a threshold QP, broadband low-pass filtering is performed. The following coefficients may be used, for example.

1·1·1·2·1·1·1

For the pixels at the ends of the image, the following coefficients are used so that no additional pixels are needed to be referenced and the calculation is simplified.

1·2·1

The filtering can be expressed as follows:

if (d1<QP) & (d2<QP) & (d3<QP) & (d4<QP) & (d5<QP) & (d6<QP) & (d7<QP), $v_n'=(v_{n-3}+v_{n-2}+v_{n-1}+2·v_n+v_{n+1}+v_{n+2}+v_{n+3})/8$ (n=4, 5)

$v_n'=(v_{n-1}+2·v_n+v_{n+1})/4$ (n=2, 7)

$v_n'=(v_{n-2}+v_{n-1}+4·v_n+v_{n+1}+v_{n+2})/8$ (n=3, 6), where QP is the threshold and QP=quantized value+d.

According to examinations conducted by the inventor, d=a value within a range from 2 to 10, especially 4 or 6, is preferable. It is also preferable that value d be changed depending on quantization. Examinations conducted by the inventor show that if the quantized value is 30 or more, d=0 is preferable.

QP=quantized value+4 is preferable inside a block and QP=quantized value×2 is preferable at a block boundary.

When all of the difference values are zero, no filtering is performed because block distortion does not exist or is unnoticeable if any.

$d=d1+d2+d3+d4+d5+d6+d7$ if (d=0), filtering is not performed.

Similarly, when one of the difference values d1 through d7 is nonzero and the others are zero, no filtering is performed because block distortion is unnoticeable.

If any of difference values d1 through d7 is large, it is determined that there is a strong edge. Then the filtering is applied only to the block boundary pixel. If a difference between pixels on either side of a block boundary is smaller than a threshold, low-pass filtering is applied to the pixels. The following coefficients may be used, for example.

1·2·1

The process is applied to signal level values $v_3$, $v_4$, $v_5$, and $v_6$:

if (d4<QP) & (d5<QP), $v_5'=(v_4+2·v_5+v_6)/4.$

Figure 4:
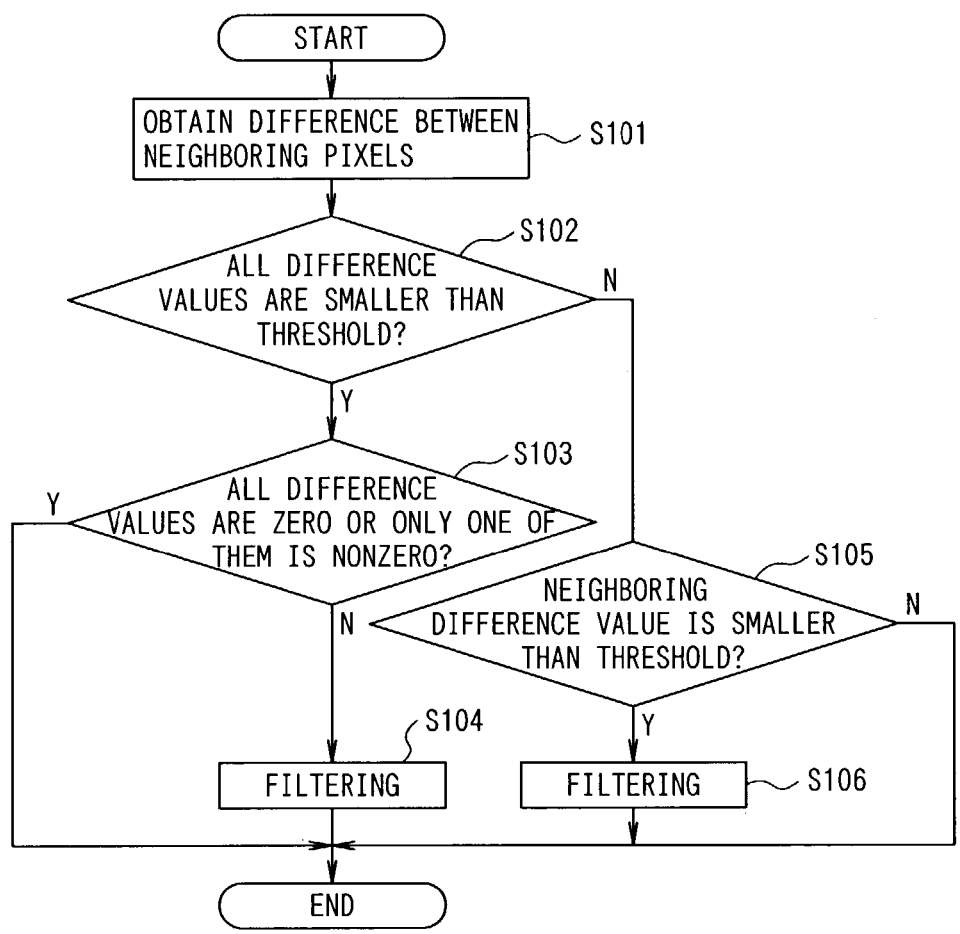
FIG. 4 is a flowchart of exemplary filtering performed by the image processing system shown in FIG. 2.

The process will be further described with reference to FIG. 4. In FIG. 4, difference values between neighboring pixels are obtained (step S101). If all the difference values obtained are smaller than a threshold, it is determined whether all the difference values are zero or only one difference value is nonzero (steps S102→S103). If all of the difference values are zero or only one difference value is nonzero, the process will end without performing filtering. On the other hand, if the condition at step S103 is not met, filtering is performed (steps S103→S104).

At step S102, if any of the difference values obtained is larger than the threshold, then it is determined whether the difference value neighboring it is smaller than a predetermined threshold (steps S102→S105). If the difference value neighboring it is smaller than the predetermined threshold, filtering is performed (steps S105→S106). In this example it is determined that there is a strong edge as described above, and filtering is performed by using coefficients, 1·2·1, as provided above (step S106). If the condition at step S105 is not met, filtering is not performed.

Figure 5:
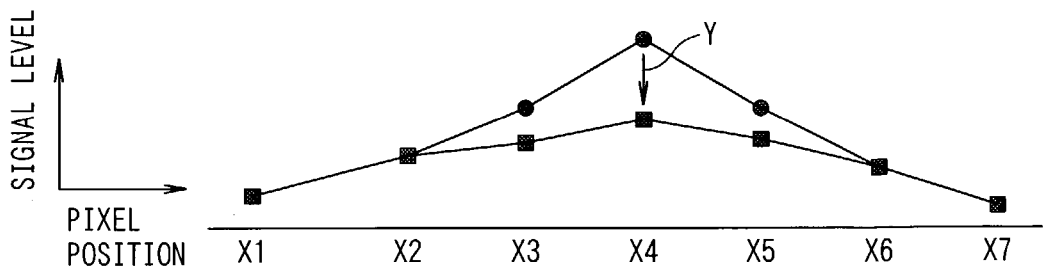
FIG. 5 shows a case where pixels next to each other but one apart from each other are referenced in the image processing system shown in FIG. 2.

According to the above-described determination, strong filtering is performed even if changes in luminance are moderate as shown in FIG. 5. If the filtering is applied to pixel positions X1 through X7 as described above, the signal levels at X3, X4, and X5 are lowered as indicated by an arrow Y as shown in FIG. 5. Such filtering should be avoided.

Therefore, an absolute difference in luminance between a pixel constituting a block boundary and the pixel next but one in the block is obtained. If the difference is smaller than a threshold, the above-described filtering is applied to them. In FIG. 5, x3 is skipped and x2 and x4 are referenced, x6 is skipped and x5 and x7 are referenced. That is, $$d21=|v_4-v_2|$$

$$d22=|v_5-v_7|$$

are calculated. If (d21<QP) & (d22<QP), then the above-described filtering is performed.

The process described above is referred to as a standard filtering process.

While a difference between a pixel and the pixel next to it but one pixel apart from it is obtained in the example described above, the number of pixels skipped may be two. In other words, they should be at least one pixel apart from each other.

Figure 6:
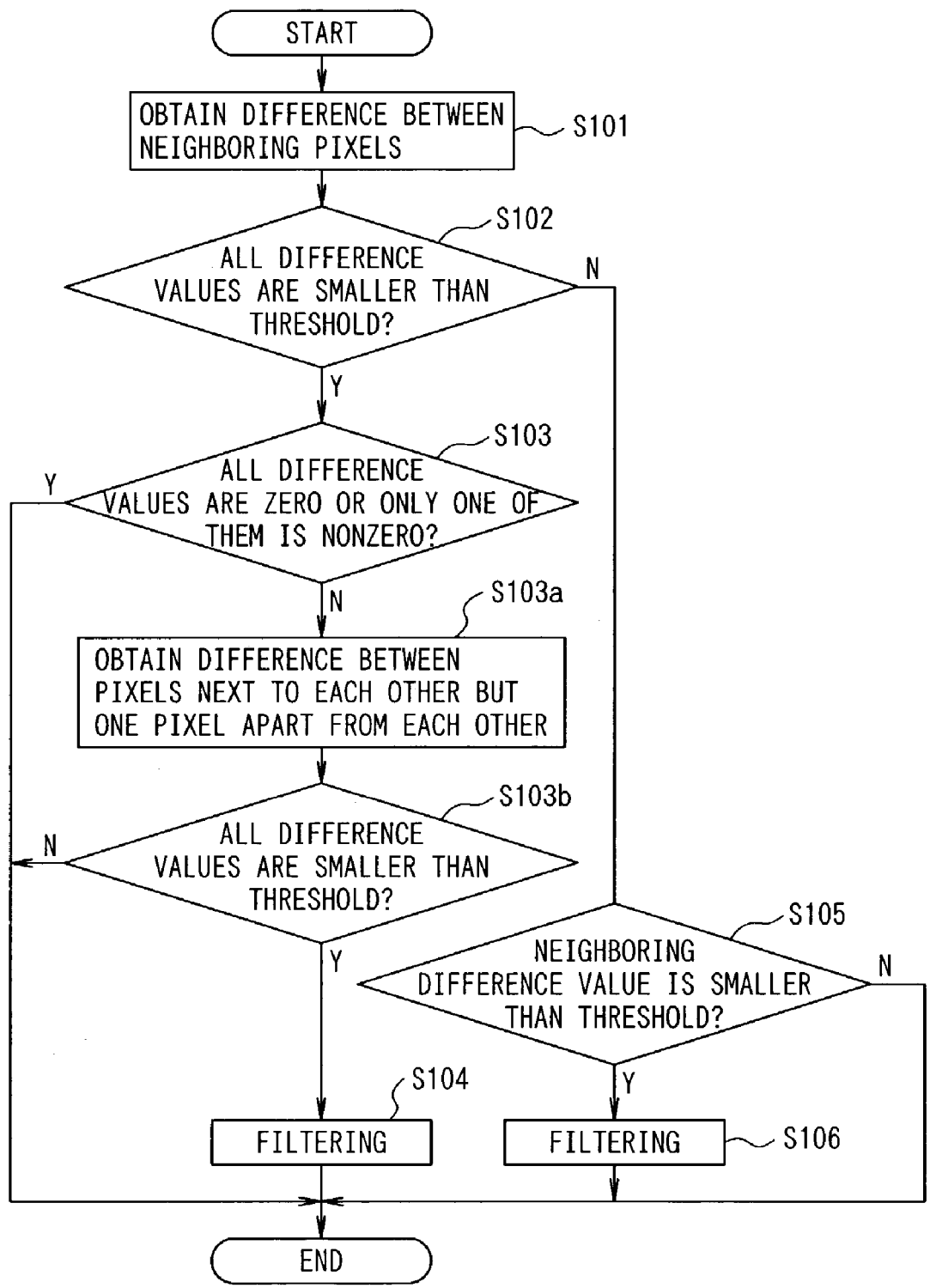
FIG. 6 is a flowchart of another exemplary filtering performed by the image processing system shown in FIG. 2.

The process will be described below with reference to FIG. 6. In FIG. 6, differences between neighboring pixels are obtained first (step S101). If all the differences are smaller than a threshold, it is determined whether all of the difference values are zero or only one of them is nonzero (steps S102→S103). If all of the difference values are zero or only one of them is nonzero, the process will end without performing filtering. Otherwise, differences between pixels next to each other but at least one pixel apart from each other are obtained (steps S103→S103a). It is determined whether all the differences obtained are smaller than the threshold (steps S103a→S103b). If all the differences obtained are smaller than the threshold, filtering is performed (steps S103b→S104). Otherwise, the process ends without performing filtering.

At step S102, if any of the differences obtained is larger than the threshold, it is determined whether the difference value neighboring it is smaller than a predetermined threshold (steps S102→S105). If the neighboring value is smaller than the predetermined threshold, filtering is performed (steps S105→S106). In this example, it is determined that there is a strong edge and coefficients such as

1·2·1 are used to perform filtering as described above (step S106) If the condition at step S105 is not met, the above-described filtering is not performed.

In some images, it may be desirable to simplify filtering. In the standard filtering process described above, filtering is applied to luminance signals (Y) and chrominance difference signals (U, V). However, it may often be enough to apply filtering to luminance signals alone. This filtering is referred to as simple filtering A herein.

If it is desirable to further simplify the filtering, three pixels on each side are referenced and two pixels are corrected, instead of referencing four pixels on each side and correcting three pixels. Coefficients used in this case may be 1·2·1, for example.

That is, if (d2<QP) & (d3<QP) & (d4<QP) & (d5<QP) & (d6<QP), $$v_n'=(v_{n-1}+2 \cdot v_n+v_{n+1})/4 \ (n=3, 6).$$

This filtering is referred to as simple filtering B herein.

On the other hand, to provide filtering smoother than the standard filtering, five pixels on each side are referenced and four pixels are corrected. In particular, equations $$d0=|v_0-v_1|$$

$$d1=|v_1-v_2|$$

$$d2=|v_2-v_3|$$

$$d3=|v_3-v_4|$$

$$d4=|v_4-v_5|$$

$$d5=|v_5-v_6|$$

$$d6=|v_6-v_7|$$

$$d7=|v_7-v_8|$$

$$d8=|v_8-v_9|$$

are used to obtain difference values d0 through d8. If all of the absolute difference values are smaller than threshold QP, broadband low-pass filtering is performed. Coefficients used may be

1·1·1·2·1·1·1, for example. The filtering can be expressed by the following equations:

if (d0<QP) & (d1<QP) & (d2<QP) & (d3<QP) & (d4<QP) & (d5<QP) & (d6<QP) & (d7<QP) & (d8<QP), $v_n'=(v_{n-3}+v_{n-2}+v_{n-1}+2 \cdot v_n+v_{n+1}+v_{n+2}+v_{n+3})/8 \ (n=3, 4, 5, 6),$ $$v_n'=(v_{n-2}+v_{n-1}+3 \cdot v_n+v_{n+1}+v_{n+2}+v_{n+3})/8 \ (n=2, 7)$$

$$v_n'=(v_{n-1}+2 \cdot v_n+v_{n+1})/4 \ (n=1, 8).$$

The process described above can reduce especially block noise. The inventor has ascertained that the process has the effect of reducing mosquito noise as well as block noise.

Implemented in the present system is an image processing method for applying filtering to a boundary pixel at a boundary of a block neighboring a block, which is a processing unit of discrete cosine transform in image compression. The method comprises the steps of determining whether correction should be performed or not by referencing 2N pixels that include the boundary pixel, consist of N pixels on each side of the boundary (N is an integer between 3 and 5 inclusive; the same applies to the following description), and run orthogonally to the boundary; and, if it is determined at the determination step that the correction should be performed, performing correction by using the boundary pixel and each set of M pixels on each side of the boundary pixel (where M is an integer smaller than N; the same applies to the following description).

Then, said determination step obtains differences between neighboring pixels in the 2N pixels referenced and, if all the differences obtained are smaller than a threshold that is determined based on a quantized value for the image, determines that said correction should be performed, or said determination step obtains differences between neighboring pixels in the 2N pixels referenced, said neighboring pixels being at least one pixel apart from each other, and, if all of the differences obtained are smaller than a threshold that is determined based on a quantized value for the image, determines that said correction should be performed. In this case, said threshold is said quantized value plus any one of an integer between 2 and 10 inclusive if said quantized value is equal to or less than 30.

Also, said determination step determines that said correction should not be performed if all of the differences between neighboring pixels in the 2N pixels referenced are zero or only one of said differences is nonzero.

Further, said determination step obtains differences between neighboring pixels in the 2N pixels referenced, said neighboring pixels being at least one pixel apart from each other, and, if any of the differences obtained is smaller than a threshold that is determined based on a quantized value for the image, determines that said correction should be performed.

Furthermore, said correction at said correction step is made to said boundary pixel according to a value obtained by multiplying said boundary pixel and each of 2M pixels on both sides of said boundary pixel by one of predetermined coefficients and dividing the product by the sum of said coefficients. In this case, the coefficient for said boundary pixel is larger than the coefficients for the other pixels.

Further, filtering is performed on one of a horizontal line and a vertical line in said block to which filtering is applied and thereafter filtering is performed on the other of the horizontal line and the vertical line.

It is obvious that a program can be provided for implementing processes illustrated in FIGS. 4 and 6 to control a computer to perform image processing as described above. The program may be stored in a semiconductor memory, magnetic disk, optical disk, or any of various other storage media, which is not shown in FIG. 1.

A second embodiment of the present invention will be described below with respect to the accompanying drawings, in which like reference characters refer to the same parts throughout the different views.

Figure 7:
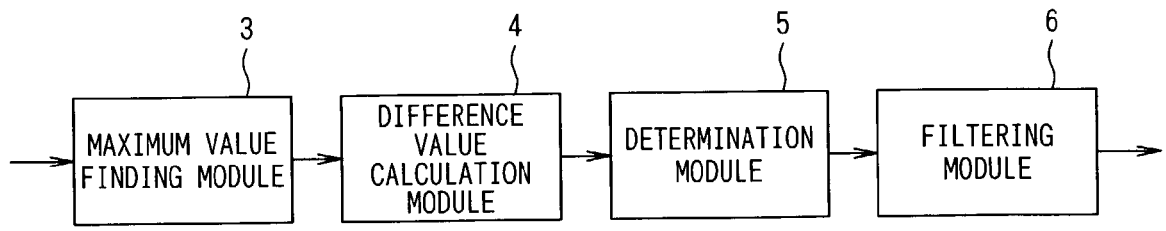
FIG. 7 is a block diagram of a configuration of an image processing system according to the present invention.

FIG. 7 shows a block diagram of one embodiment of an image processing system according to the present invention. As shown in FIG. 7, the image processing system according to this embodiment comprises a maximum value finding module 3 for obtaining the maximum value of difference values between neighboring pixels, including a boundary pixel, in at least half of all the pixels composing a block to be processed; a difference value calculation module 4 for calculating difference values between 2N pixels, including the boundary pixel, that consist of N pixels on each side of the boundary and run orthogonally to the boundary; a determination module for comparing the difference values calculated by the difference value calculation module 4 with a threshold corresponding to the maximum value to determine whether filtering should be performed; and a filtering module 6 for using the boundary pixel and each set of M pixels on each side of the boundary pixel to perform filtering if the determination module 5 determines that filtering should be performed, where N is a positive integer and M is a positive integer smaller than N. A buffer may be provided for temporarily holding a block to which filtering is to be applied, as will be described later.

The system will be described below more specifically. In this example, all pixels at a vertical block boundary B1 as shown in FIG. 1 are first processed (pixels running orthogonally to the block boundary B1 are referenced), then all pixels at a horizontal block boundary B2 are processed (pixels running orthogonally to the block boundary B2 are referenced). Alternatively, the process may be first applied to all the pixels at the horizontal block boundary B2, then to all the pixels at the vertical block boundary B1. Image processing is applied to each of luminance signal (Y) and chrominance difference signal (U, V) images.

In this system, a maximum difference value $d_{max}$ between neighboring pixels is obtained by the maximum value finding module 3 on a half-block basis. For horizontal block boundary filtering, four pixels on each side of a block boundary on each of 8 vertical lines are used to obtain differences between neighboring pixels. For vertical block boundary filtering, four pixels on each side of a block boundary on each of 8 horizontal rows are used to obtain differences between neighboring pixels. In particular, equations $$d1 = |v_1 - v_2|$$

$$d2 = |v_2 - v_3|$$

$$d3 = |v_3 - v_4|$$

are used to obtain difference values d1 through d3. As a result, maximum neighborhood difference value in a half-block can be obtained. Eight pixels on each side of a boundary line are referenced on at least one line that passes through the center of the block (for example line L4 in FIG. 11(b), which will be described later). Then, difference values are obtained similarly and compared with one another to select the largest one as the maximum value $d_{max}$.

Four pixels on each side of a block boundary, including pixels at the block boundary, are used to obtain difference between neighboring pixels for each horizontal and vertical line. That is, $$d1 = |v_1 - v_2|$$

$$d2 = |v_2 - v_3|$$

$$d3 = |v_3 - v_4|$$

$$d4 = |v_4 - v_5|$$

$$d5 = |v_5 - V_6|$$

$$d6 = |v_6 - v_7|$$

$$d7 = |v_7 - v_8|$$

are used to obtain difference values d1 through d7.

If all of the difference values are smaller than a threshold, broadband low-pass filtering is used. The threshold is determined for each block based on the maximum value $d_{max}$ obtained as described above. The threshold for pixels at a block boundary is chosen to be a value larger than that for pixels within the block. For example,

```
if (d_max > 100) {
        QP3 = QP + 34;
        QP2 = (QP + 12) * 2;
}
        else if (d_max > 30) {
        QP3 = QP + 8;
        QP2 = (QP + 4) * 2;
}
        else {
        QP2 = QP * 2;
        if (QP > 14)   QP3 = 14;
        else           QP3 = QP3 + 4;
},
``` where QP is a quantized value for the image containing the block. The values of QP2 and QP3 can be determined by using the conditional expression provided above.

Filtering coefficients

1·1·1·2·1·1·1 are used. This filtering process can be expressed by the following expressions.

if (d1<QP1) & (d2<QP1) & (d3<QP1) &
 (d4<QP2) & (d5<QP3) & (d6<QP3) &
 (d7<QP3), $v_n'=(v_{n-3}+v_{n-2}+v_{n-1}+2·v_n+v_{n+1}+v_{n+2}+v_{n+3})/8$ (n=4, 5)

$v_n'=(v_{n-2}+v_{n-1}+3·v_n+v_{n+1}+v_{n+2})/8$ (n=3, 6)

$v_n'=(v_{n-1}+2·v_n+v_{n+1})/4$ (n=2, 7)

A data storage process required for performing the filtering process described above will be described below. In this example, like the first embodiment, an 8×8-pixel temporary storage block can be used as a unit for filtering. However, the filtering process as described above is performed on each section separated by block boundaries in the temporary storage block based on a threshold that is determined for each block to which the section belongs. That is, the above-described process on the temporary storage block cannot be performed only by values obtained from pixels in the temporary storage block.

In order that the above-described process can be performed, the following method, for example, is used.

First, a temporary storage block (8×8 pixels) is stored in a buffer before performing the process. A maximum difference value for each section contained in the temporary storage block is calculated.

Consequently, for each 4×4-pixel section resulting from the division of each 8×8-pixel block, maximum difference values from a previously processed section is calculated.

Figure 8:
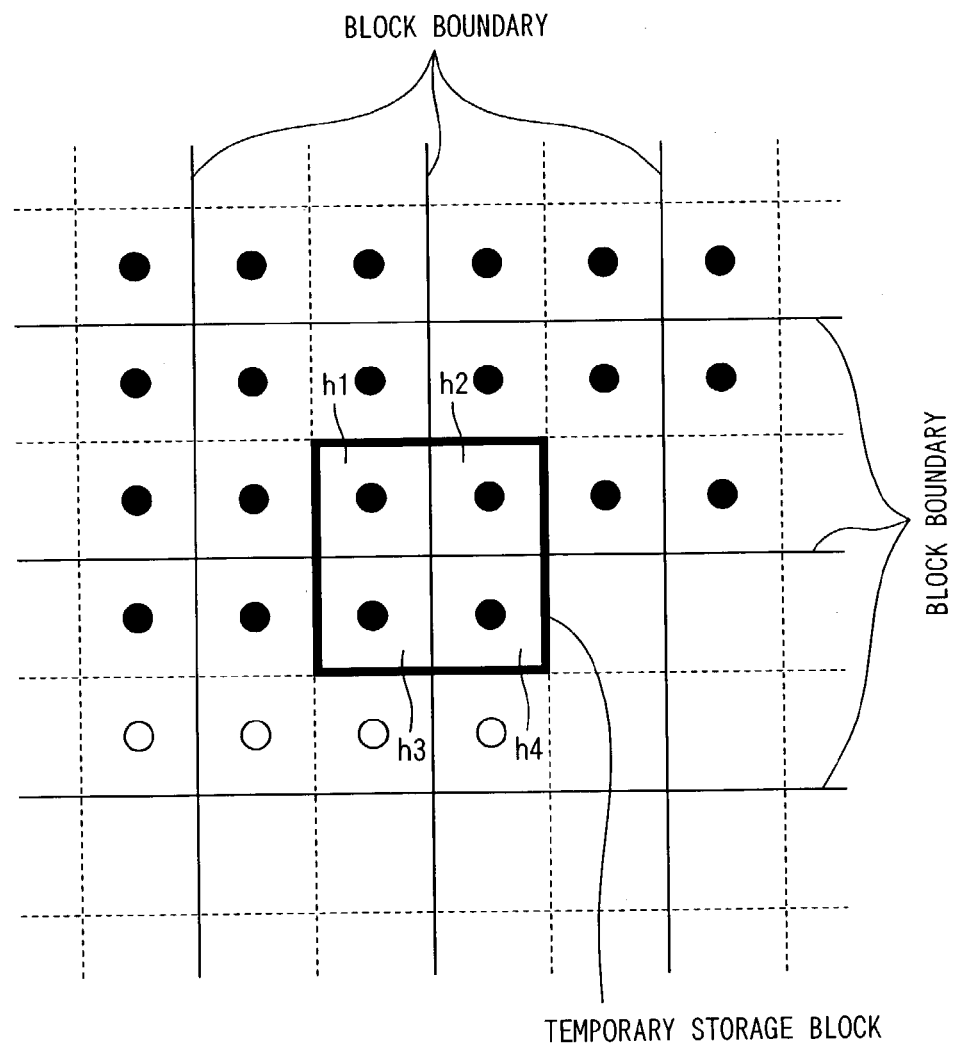
FIG. 8 shows a temporary storage block in a frame to be processed and 4×4-pixel section for which a maximum difference value is calculated.

FIG. 8 shows the temporary storage block in a frame to be processed and a 4×4-pixel section for which a maximum difference value is calculated. In FIG. 8, reference characters h1 through h4 indicate 4×4-pixel sections in the temporary storage block and black dots indicate sections for which a maximum difference value has been calculated.

When the above-described process is applied to one of sections (h1 through h4) contained in the temporary storage block, the maximum one among maximum difference values of sections in the block to which that section belongs is used as the maximum value $d_{max}$ described above to determine a threshold.

For the upper two sections (h1 and h2) out of the sections contained in the temporary storage block, maximum difference values for all the sections of the block to which the two sections belong have been calculated in the previous process. For the lower two sections (h3 and h4), on the other hand, the whole block to which they belong has not yet been processed as a temporary storage block and therefore maximum difference values for the other sections of that block have not yet been obtained.

In a first method, the maximum one of maximum difference values that have already been obtained for sections of the block to which the lower two sections belong is used as the maximum value $d_{max}$ to determine a threshold. That is, in the block to which section h3 belongs, either the maximum difference value of section h3 or that of the section on the left of section h3, whichever is larger, is used as the maximum value $d_{max}$ to determine a threshold. In the block to which section h4 belongs, the maximum difference value of section h4 is used to determine a threshold.

In a second method, in the block containing the lower two sections of the temporary storage block, the sections (two 4×4-pixel sections) directly below the two sections are added to the temporary storage block and read out prior to the other blocks in that block. Maximum difference values of these sections are calculated in processing of the temporary storage block. That is, the temporary storage block is stored as an 8×12-pixel block and maximum difference values of the sections are calculated while filtering is being applied to the upper 8×8-pixel region. White dots in FIG. 8 indicate sections which are read out precedently and for which maximum difference values are calculated. In the second method, a threshold can be obtained that is more precise than one that can be obtained in the first method.

Thus, the first or second method can be used to store the temporary storage block alone and apply the above-described process to it without having to store the entire frame.

The process will be further described with reference to FIG. 9.

Figure 9:
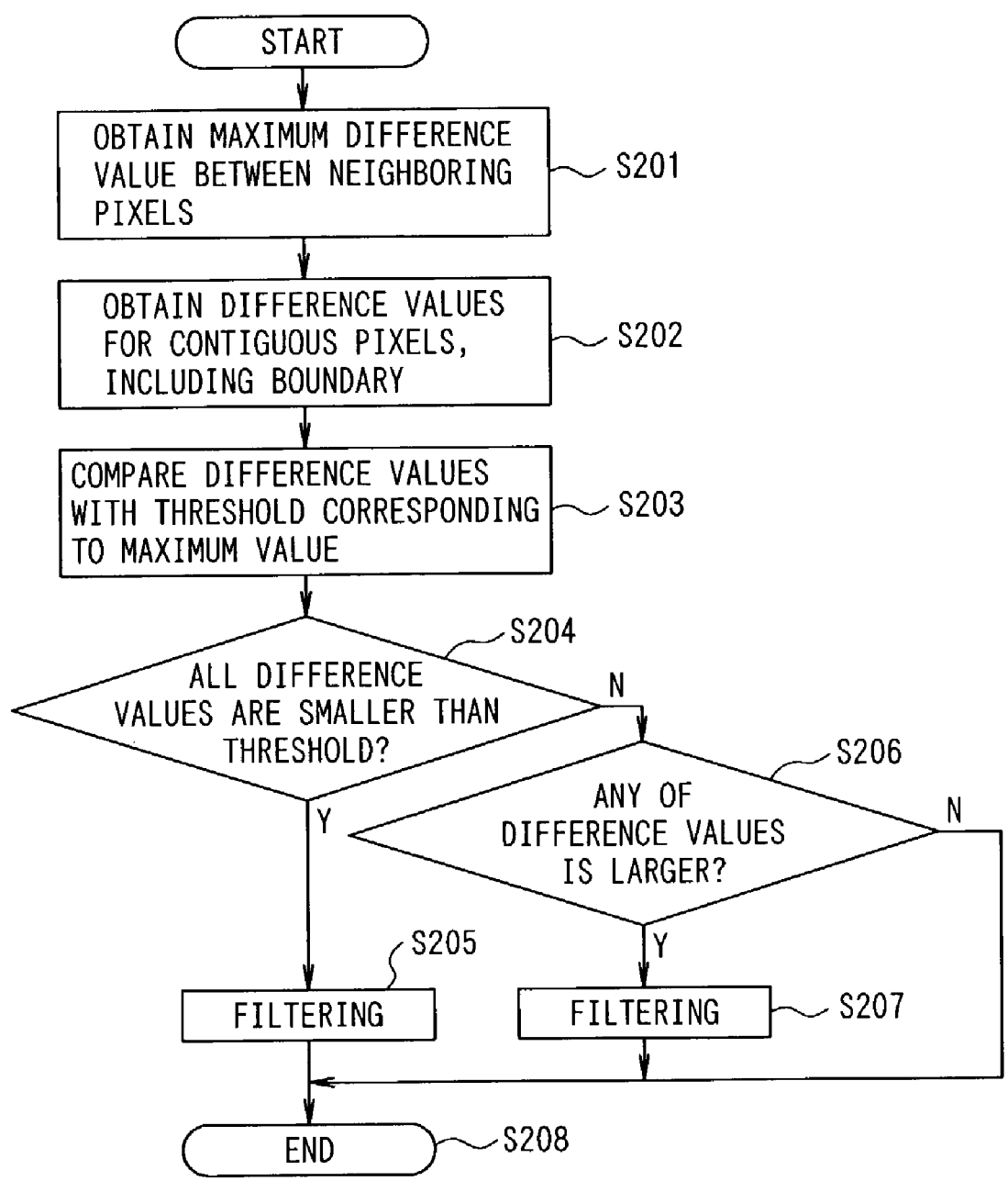
FIG. 9 is a flowchart of exemplary filtering performed by the image processing system shown in FIG. 7.

In FIG. 9, the maximum value of difference values between neighboring pixels in at least half of all the pixels, including a boundary pixel, that compose a block to be processed is obtained (step S201). Then, difference values between neighboring pixels in 2N pixels, including a boundary pixel, that consist of N pixels on each side of the boundary and run orthogonally to the boundary are obtained (step S202).

Then, the difference values obtained at step S202 are compared with a threshold corresponding to the maximum value to determine whether filtering should be performed (step S203) If all the difference values are smaller than the threshold, filtering is performed (steps S204→S205).

If any of the difference values is not smaller than the threshold at step S204, it is determined whether a difference neighboring it is smaller than a predetermined threshold (steps S204→S206). If the neighboring difference is smaller than the predetermined threshold, filtering is performed (steps S206→S207). The filtering is performed because some of difference values can be smaller than a predetermined threshold if not all the difference values are smaller than the predetermined threshold. At steps S206 and S207, each of neighboring pixel difference values of three pixels $V_2$ through $V_7$ on each side is compared with the threshold. If a difference value is smaller than the threshold, coefficients 1·2·1 are used to perform filtering. Mosquito noise resulting from a large edge contained in a region to be evaluated can be reduced by this filtering.

On the other hand, if the neighboring difference is not smaller than the predetermined threshold at step S206, the process will end without performing filtering (steps S206→S208).

According to the above-described determination, strong filtering is performed even if changes in luminance are moderate similarly to the case of FIG. 5. If the filtering is applied to pixel positions X1 through X7 as described above as shown in FIG. 5, the signal levels at X3, X4, and X5 are lowered as indicated by an arrow Y. Such filtering should be avoided.

Therefore, an absolute difference in luminance between a pixel constituting a block boundary and the pixel next but one in the block is obtained. If the difference is smaller than a threshold, the above-described filtering is applied to them. In FIG. 5, x3 is skipped and x2 and x4 are referenced, x6 is skipped and x5 and x7 are referenced; That is, $d21=|v_4-v_2|$ $d22=|v_5-v_7|$ are calculated. If (d21<QP) & (d22<QP), then the filtering is performed.

The above-described process will be further described with reference to FIG. 10.

Figure 10:
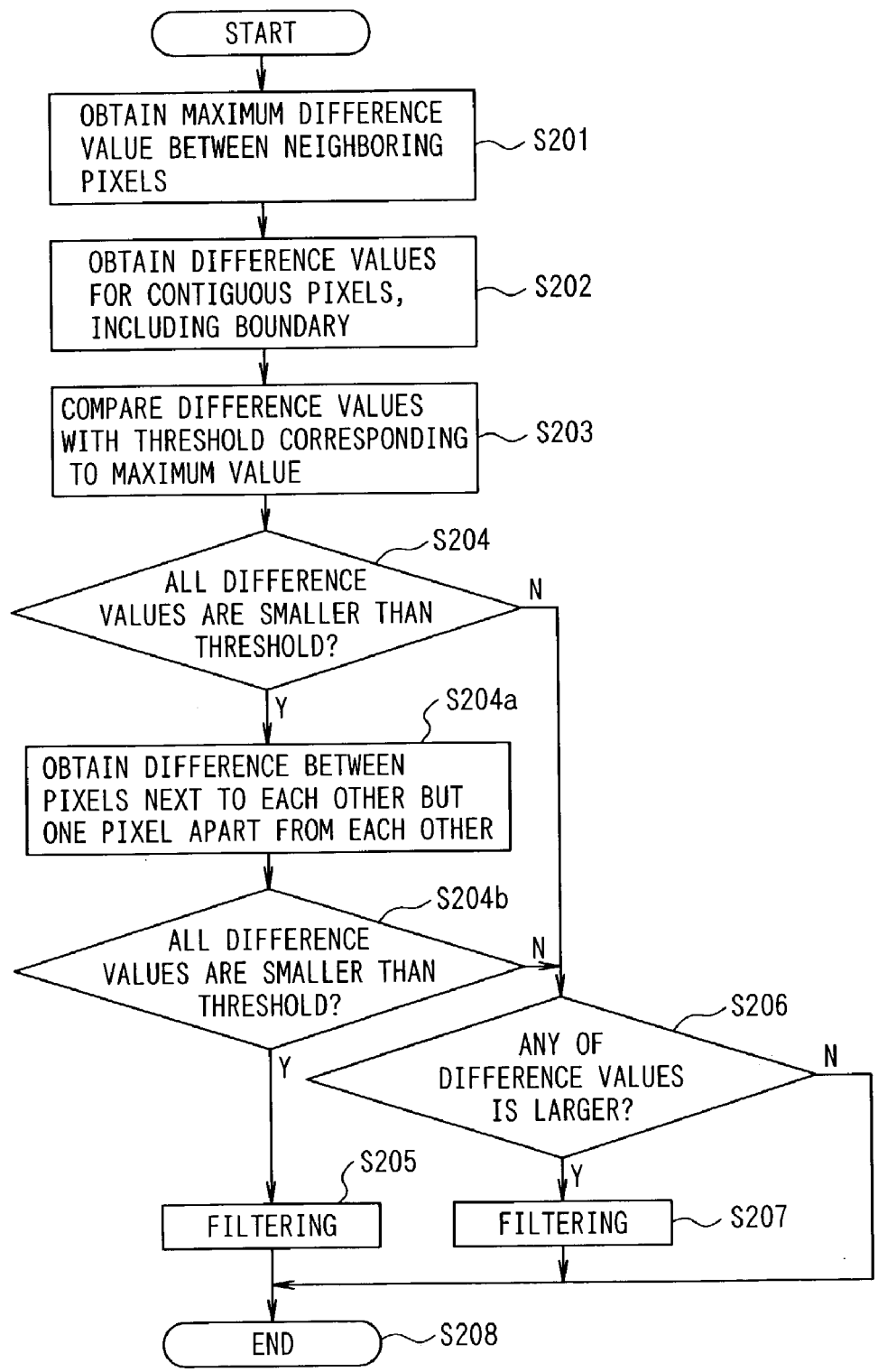
FIG. 10 is a flowchart of another exemplary filtering performed by the image processing system shown in FIG. 7.
Figure 13:
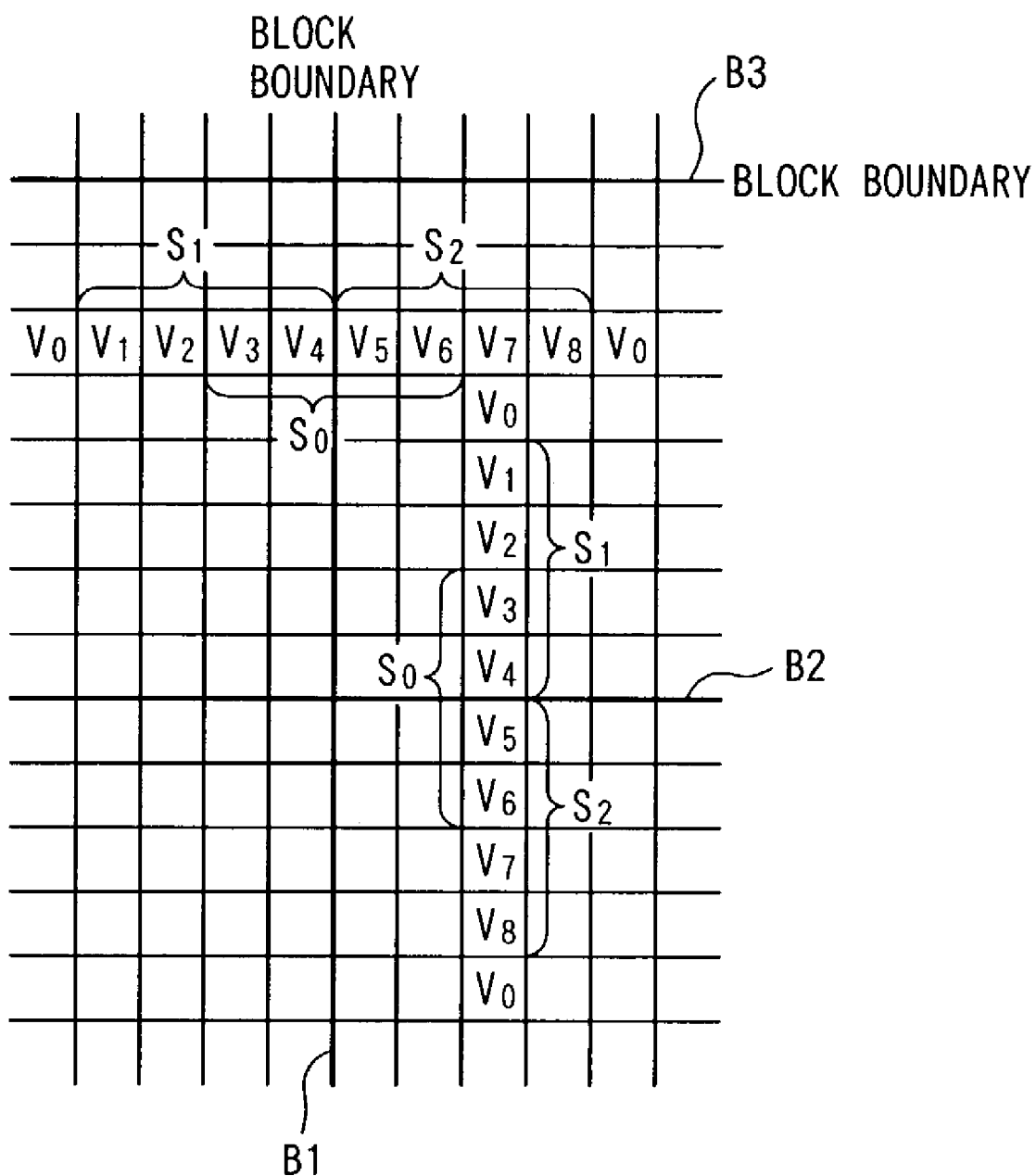
FIG. 13 shows pixels referenced in the image processing system according to the prior art.

In FIG. 10, the maximum value of difference values between neighboring pixels in at least half of all the pixels, including a boundary pixel, that compose a block to be processed is obtained (step S201). Then, difference values between neighboring pixels in 2N pixels, including a boundary pixel, that consist of N pixels on each side of the boundary and run orthogonally to the boundary are obtained (step S202).

Then, the difference values obtained at step S202 are compared with a threshold corresponding to the maximum value to determine whether filtering should be performed (step S203). If all the difference values obtained are smaller than the threshold, difference values between pixels next to each other but at least one pixel apart from each other are obtained (steps S204→S204a). If all the difference values obtained are smaller than the threshold, filtering is performed (steps S204b→S205).

If any of the difference values obtained is larger than the threshold at step S204 or S204b, it is determined whether the difference neighboring it is smaller than a predetermined threshold (steps S204→S206 and steps 204b→S206). If the neighboring difference is smaller than the predetermined threshold, filtering is performed (steps S206→S207). The filtering is performed because some of difference values can be smaller than a predetermined threshold if not all the difference values are smaller than the predetermined threshold. At steps S206 and S207, each of neighboring pixel difference values of three pixels $V_2$ through $V_7$ on each side is compared with the threshold. If a difference value is smaller than the threshold, coefficients 1·2·1 are used to perform filtering.

On the other hand, if the neighboring difference is not smaller than the predetermined threshold at step S206, the process will end without performing filtering (steps S206→S208).

In some images, simplified filtering may be desirable. In the filtering process described above, filtering is applied to each of luminance signals (Y) and chrominance difference signals (U, V). However, it may often be enough to apply filtering to luminance signals alone.

(Simplified Process)

The following variations may be used to reduce a processing load of the above-described process. The threshold of filtering is determined according to a quantized value regardless of the size of an edge within a block. If that filtering is not performed, it is determined on a pixel basis whether filtering should be performed based on the maximum value of difference values (maximum neighborhood difference values) $d_{max}$ between pixels and pixels on both sides of those pixels.

Every other line is searched for the maximum neighborhood difference value as shown in FIG. 11(a). That is, instead of searching through all of lines L1 through L8, lines are alternately skipped in FIG. 11(a). In the example shown, pixels indicated by black dots on lines L1, L3, L5, and L7 in the right half of the drawing are searched through. Further, pixels indicated by black dots on line L4 in the left half of the drawing are searched through. Difference values between four pixels on each of lines L1, L3, L5, and L7 are obtained. On line L4 in the middle, difference values between five pixels (in the left half of the drawing) far from a block boundary B are obtained.

In this way, edges in almost all directions in the block will probably be detected. Black dots in FIG. 11(b) indicate pixels used for detecting differences (when vertical block boundary filtering is performed). In this way, edges expected on dashed lines in FIG. 11(b) can be detected by searching through pixels disposed. That is, every dashed line in FIG. 11(b) passes through some of the black dots, therefore any of the dashed line can be detected as an edge. On the other side of the boundary of interest, black dots at the position horizontally symmetrical to the above-described dots are searched.

(Variations)

Possible variations include the following ones. The above-described maximum neighborhood difference value may be obtained in a whole block, rather than a half block as shown in FIG. 11. This variation can provide more precise results.

The method for selecting lines to be searched is not limited to one in which the first line L1, third line L3, fifth line L5, seventh line L7, and fourth line L4 are searched through as indicated by the black dots in FIG. 11. Various other methods for selecting lines to be searched may be used. The first line L1, third line L3, fifth line L5, eighth line L8, second line L2 and seventh line L7 may be searched through.

Also, pixels to be searched on searched line are not limited to four in the right half of a block and five in the left half of the block. Five pixels in the right half of a block and four pixels in the left half of the block may be searched.

While two thresholds QP2 and QP3 are added and each of three thresholds is used to each of three cases, any number of thresholds may be used. However, it is effective that the thresholds are determined based on a quantized value QP because they have a strong correlation with the quantized value.

In an image processing system as described above, an image processing method as will be described below is implemented. There is provided an image processing method for performing filtering on pixels belonging to a block which is a unit of discrete cosine transform in image compression, characterized in that the image processing system comprises: the maximum value finding step of finding the maximum value of differences between neighboring pixels in at least half of all pixels composing a block to be processed, the half including a pixel of interest; the difference calculation step of calculating differences between neighboring pixels in 2N pixels, including the pixel of interest, that consist of N pixels on each side of the boundary between the block and another block and run orthogonally to the boundary, where N is a positive integer; the same applies to the following description; the determination step of comparing the differences obtained at the difference calculation step with a threshold corresponding to the maximum value to determine whether filtering should be performed; and the filtering step of performing filtering by using the pixel of interest and each set of M pixels on each side of the pixel of interest if the determination step determines that filtering should be performed, where M is a positive integer smaller than N; the same applies to the following description. The difference calculation step calculates differences between neighboring pixels in 2N pixels referenced; and the determination step determines that the filtering should be performed if all the differences obtained at the difference calculation step are smaller than the threshold, or the difference calculation step calculates differences between neighboring pixels in the 2N pixels referenced, the neighboring pixels being at least one pixel apart from each other, and, if all of the differences obtained at the difference calculation step are smaller than a threshold that is determined based on a quantized value for the image, the determination step determines that the filtering should be performed.

The determination step determines the threshold according to the maximum value. A higher threshold is set for pixels at a boundary of the block to be processed than a threshold for pixels within the block to be processed.

The determination step determines that predetermined filtering differing from the above-mentioned filtering should be performed if all of the differences are not smaller than the threshold and a difference between neighboring pixels in the M pixels is smaller than a predetermined threshold.

The filtering step makes correction to the pixel of interest according to a value obtained by multiplying the pixel of interest and each of a plurality of pixels on each side of the pixel of interest by one of predetermined coefficients and dividing the product by the sum of the coefficients. The maximum value finding step searches pixels to be searched on every other line for the maximum value. The filtering is performed on one of a horizontal line and a vertical line in the block to which filtering is applied and thereafter filtering is performed on the other of the horizontal line and the vertical line.

It is obvious that a program can be provided for implementing processes illustrated in FIGS. 9 and 10 to control a computer to perform image processing as described above. The program may be stored in a semiconductor memory, magnetic disk, optical disk, or any of various other storage media, which is not shown in FIG. 7.

While the present system has been described with respect to mosquito noise removal, the inventor has ascertained that the system can reduce block noise as well. Because the mosquito noise removal process performed by the system has affinity for block noise removal process, the present system can be easily added to a system that implements block noise removal. Therefore, the functions of the present system can readily be added or removed from the system implementing block noise removal. The mosquito noise removal function of the present system may be provided in that system and that system may be arranged so as to turn on/off the mosquito noise removal function in response to a request from a user.

INDUSTRIAL APPLICABILITY

The present invention has an advantage that it can reduce especially block noise by referencing 2N pixels, including a boundary pixel, that consist of N pixels on each side of a boundary and run orthogonally to the boundary to determine whether correction should be performed or not and, if it is determined that correction should be performed, using the boundary pixel and each set of M pixels on each side of the boundary pixel to perform the correction.

The present invention has another advantage that it can reduce mosquito noise by a simple process comprising the steps of obtaining the maximum value of differences between neighboring pixels in at least half, including a pixel of interest, of all the pixels composing a block to be processed; obtaining difference values between neighboring pixels in 2N pixels, including the pixel of interest, that consist of N pixels on each side of the boundary between blocks, and run orthogonally to the boundary; comparing the difference values obtained with a threshold corresponding to that maximum value to determine whether filtering should be performed; and, if it is determined that filtering should be performed, using the pixel of interest and each set of M pixels on each side of the boundary to perform the filtering.

The invention claimed is:

1. An image processing system for performing filtering on a boundary pixel at the boundary between neighboring blocks, said block being a unit of discrete cosine transform in image compression, said image processing system, characterized by comprising:

determination means for referencing 2N pixels, including said boundary pixel, that consist of N pixels on each side of said boundary and run orthogonally to said boundary to determine whether correction should be performed, where N is an integer between 3 and 5 inclusive; and correction means for performing correction by using said boundary pixel and each set of M pixels on each side of said boundary pixel if said determination means determines that correction should be performed, where M is an integer smaller than N;

filtering means for performing filtering by using said pixel of interest and each set of M pixels on each side of said pixel of interest if said determination means determines that filtering should be performed, where M is a positive integer smaller than N.

2. The image processing system according to claim 1, characterized in that said determination means obtains differences between neighboring pixels in the 2N pixels referenced and, if all the differences obtained are smaller than a threshold that is determined based on a quantized value for the image determines that said correction should be performed.

3. The image processing system according to claim 1, characterized in that said determination means obtains differences between neighboring pixels in the 2N pixels referenced, said neighboring pixels being at least one pixel apart from each other, and, if all of the differences obtained are smaller than a threshold that is determined based on a quantized value for the image, determines that said correction should be performed.

4. The image processing system according to claim 1, characterized in that said threshold is said quantized value plus an integer between 2 and 10 inclusive if said quantized value is equal to or less than 30.

5. The image processing system according to claim 1, characterized in that said determination means determines that said correction should not be performed if all of the differences between neighboring pixels in the 2N pixels referenced are zero or only one of said differences is nonzero.

6. The image processing system according to claim 1, characterized in that said determination means obtains differences between neighboring pixels in the 2N pixels referenced, and, if any of the differences obtained is smaller than a threshold that is determined based on a quantized value for the image, determines that said correction should be performed.

7. The image processing system according to claim 1, characterized in that said correction by said correction means is made to said boundary pixel according to a value obtained by multiplying said boundary pixel and each of 2M pixels on both sides of said boundary pixel by one of predetermined coefficients and dividing the product by the sum of said coefficients.

8. The image processing system according to claim 7, characterized in that the predetermined coefficient for said boundary pixel is larger than the coefficients for the other pixels.

9. The image processing system according to claim 1, characterized in that filtering is performed on one of a horizontal line and a vertical line in said block to which filtering is applied and thereafter filtering is performed on the other of the horizontal line and the vertical line.

10. The image processing system according to claim 1, characterized in that the image processing system comprises storage means for storing each set of four pixels on each side of each of said horizontal and vertical boundaries, said each set of four pixels running from the intersection of said horizontal and vertical boundaries, wherein predetermined pixels contained in said block are sequentially stored in said storage means and said determination means and said correction means process the 8×8 pixels stored in said storage means.

11. An image processing method for performing filtering on a boundary pixel at the boundary between neighboring blocks, said block being a unit of discrete cosine transform in image compression, characterized by comprising:
a determination step of referencing 2N pixels, including said boundary pixel, that consist of N pixels on each side of said boundary and run orthogonally to said boundary to determine whether correction should be performed, where N is an integer between 3 and 5 inclusive; and
a correction step of performing correction by using said boundary pixel and each set of M pixels on each side of said boundary pixel, if said determination step determines that correction should be performed, where M is an integer smaller than N;
wherein said correction step is made to said boundary pixel according to a value obtained by multiplying said boundary pixel and each of 2M pixels on both sides of said boundary pixel by one of predetermined coefficients and dividing the product by the sum of said coefficients.

12. The image processing method according to claim 11, characterized in that said determination step obtains differences between neighboring pixels in the 2N pixels referenced and, if all the differences obtained are smaller than a threshold that is determined based on a quantized value for the image, determines that said correction should be performed.

13. The image processing method according to claim 11, characterized in that said determination step obtains differences between neighboring pixels in the 2N pixels referenced, said neighboring pixels being at least one pixel apart from each other, and, if all of the differences obtained are smaller than a threshold that is determined based on a quantized value for the image, determines that said correction should be performed.

14. The image processing method according to claim 11, characterized in that said threshold is said quantized value plus an integer between 2 and 10 inclusive if said quantized value is equal to or less than 30.

15. The image processing method according to claim 11, characterized in that said determination step determines that said correction should not be performed if all of the differences between neighboring pixels in the 2N pixels referenced are zero or only one of said differences is nonzero.

16. The image processing method according to claim 11, characterized in that said determination step obtains differences between neighboring pixels in the 2N pixels referenced, and, if any of the differences obtained is smaller than a threshold that is determined based on a quantized value for the image, determines that said correction should be performed.

17. The image processing method according to claim 11, characterized in that the predetermined coefficient for said boundary pixel is larger than the coefficients for the other pixels.

18. The image processing method according to claim 11, characterized in that filtering is performed on one of a horizontal line and a vertical line in said block to which filtering is applied and thereafter filtering is performed on the other of the horizontal line and the vertical line.

19. The image processing method according to claim 11, characterized in that each set of four pixels on each side of each of said horizontal and vertical boundaries in said block is stored, said each set of four pixels running from the intersection of said horizontal and vertical boundaries, and said determination step and said correction step process the stored 8×8 pixels.

20. An image processing program for performing filtering on a boundary pixel at the boundary between neighboring blocks, said block being a unit of discrete cosine transform in image compression, characterized by comprising:
a determination step of referencing 2N pixels, including said boundary pixel, that consist of N pixels on each side of said boundary and run orthogonally to said boundary to determine whether correction should be performed, where N is an integer between 3 and 5 inclusive; and
a correction step of performing correction by using said boundary pixel and each set of M pixels on each side of said boundary pixel, if said determination step determines that correction should be performed, where M is an integer smaller than N;
wherein said correction step is made to said boundary pixel according to a value obtained by multiplying said boundary pixel and each of 2M pixels on both sides of said boundary pixel by one of predetermined coefficients and dividing the product by the sum of said coefficients.

21. The image processing program according to claim 20, characterized in that said determination step obtains differences between neighboring pixels in the 2N pixels referenced and, if all the differences obtained are smaller than a threshold that is determined based on a quantized value for the image, determines that said correction should be performed.

22. The image processing program according to claim 20, characterized in that said determination step obtains differences between neighboring pixels in the 2N pixels referenced, said neighboring pixels being at least one pixel apart from each other, and, if all of the differences obtained are smaller than a threshold that is determined based on a quantized value for the image, determines that said correction should be performed.

23. The image processing program according to claim 20, characterized in that said threshold is said quantized value plus an integer between 2 and 10 inclusive if said quantized value is equal to or less than 30.

24. The image processing program according to claim 20, characterized in that said determination step determines that said correction should not be performed if all of the differences between neighboring pixels in the 2N pixels referenced are zero or only one of said differences is nonzero.

25. The image processing program according to claim 20, characterized in that said determination step obtains differences between neighboring pixels in the 2N pixels referenced, and, if any of the differences obtained is smaller than a threshold that is determined based on a quantized value for the image, determines that said correction should be performed.

26. The image processing program according to claim 21, characterized in that the predetermined coefficient for said boundary pixel is larger than the coefficients for the other pixels.

27. The image processing program according to claim 20, characterized in that filtering is performed on one of a horizontal line and a vertical line in said block to which filtering is applied and thereafter filtering is performed on the other of the horizontal line and the vertical line.

28. The image processing program according to claim 20, characterized in that each set of four pixels on each side of each of said horizontal and vertical boundaries in said block is stored, said each set of four pixels running from the intersection of said horizontal and vertical boundaries, and said determination step and said correction step process the stored 8×8 pixels.

29. An image processing system for performing filtering on pixels belonging to a block which is a unit of discrete cosine transform in image compression, characterized by comprising:
maximum value finding means capable of finding the maximum value of differences between neighboring pixels in at least half of all pixels composing a block to be processed, said half including a pixel of interest;
difference calculation means for calculating differences between neighboring pixels in 2N pixels, including said pixel of interest, that consist of N pixels on each side of the boundary between said block and another block and run orthogonally to said boundary, where N is a positive integer;
determination means for comparing said differences obtained by said difference calculation means with a threshold corresponding to said maximum value to determine whether filtering should be performed; and
filtering means for performing filtering by using said pixel of interest and each set of M pixels on each side of said pixel of interest if said determination means determines that filtering should be performed, where M is a positive integer smaller than N.

30. The image processing system according to claim 29, characterized in that said difference calculation means calculates differences between neighboring pixels in 2N pixels referenced; and
said determination means determines that said filtering should be performed if all the differences obtained by said difference calculation means are smaller than said threshold.

31. The image processing system according to claim 29, characterized in that said difference calculation means calculates differences between neighboring pixels in the 2N pixels referenced, said neighboring pixels being at least one pixel apart from each other, and, if all of the differences obtained by said difference calculation means are smaller than a threshold that is determined based on a quantized value for the image, said determination means determines that said filtering should be performed.

32. The image processing system according to claim 29, characterized in that said determination means determines that predetermined filtering differing from said filtering should be performed if all of said differences are not smaller than said threshold and a difference between neighboring pixels in said M pixels is smaller than a predetermined threshold.

33. The image processing system according to claim 29, characterized in that said determination means determines said threshold according to said maximum value.

34. The image processing system according to claim 29, characterized in that said determination means sets a higher threshold for pixels at a boundary of the block to be processed than a threshold for pixels within the block to be processed.

35. The image processing system according to claim 29, characterized in that said filtering means makes correction to said pixel of interest according to a value obtained by multiplying said pixel of interest and each of a plurality of pixels on each side of said pixel of interest by one of predetermined coefficients and dividing the product by the sum of said coefficients.

36. The image processing system according to claim 29, characterized in that said maximum value finding means searches pixels to be searched on every other line for said maximum value.

37. The image processing system according to claim 29, characterized in that filtering is performed on one of a horizontal line and a vertical line in said block to which filtering is applied and thereafter filtering is performed on the other of the horizontal line and the vertical line.

38. The image processing system according to claim 29, characterized by comprising:
storage means for storing each set of four pixels on each side of each of said horizontal and vertical boundaries, said each set of four pixels running from the intersection of said horizontal and vertical boundaries; and
tentative-maximum-value obtaining means for calculating differences between said neighboring pixels in 8×8 pixels stored in said storage means to obtain a tentative maximum value that is the maximum value of said differences between pixels in each set of 4×4 pixels separated by said boundary;
in which said maximum value finding means determines as said maximum value the maximum one of all tentative maximum values in said block if said tentative maximum values in the entire block have already been obtained, or determines as said maximum value the maximum one of tentative maximum values obtained if not all of said tentative maximum values in the entire block have been obtained;

said difference calculation means and said filtering means process the 8×8 pixels stored in said storage means.

39. The image processing system according to claim 29, characterized by comprising:

storage means for storing each set of four pixels on each side of said vertical boundary and four pixels located above said horizontal boundary and eight pixels located below said horizontal boundary running from the intersection of said horizontal and vertical boundaries;

tentative-maximum-value obtaining means for calculating differences between said neighboring pixels in 8×12 pixels stored in said storage means to obtain a tentative maximum value that is the maximum one of differences between pixels in a set of 4×4 pixels, said set being a unit provided by dividing said 8×12 pixels into two rows and three lines;

in which, said maximum value finding means determines as said maximum value the maximum one of all tentative maximum values in the block if tentative maximum values in the entire block have already been obtained, or determines as said maximum value the maximum one of tentative maximum values obtained if not all of said tentative maximum values in the entire block have been obtained;

said difference calculation means and said filtering means process the upper 8×8 pixels in the 8×12 pixels stored in said storage means.

40. An image processing method for performing filtering on pixels belonging to a block which is a unit of discrete cosine transform in image compression, characterized in that said image processing system comprises:

the maximum value finding step of finding the maximum value of differences between neighboring pixels in at least half of all pixels composing a block to be processed, said half including a pixel of interest;

the difference calculation step of calculating differences between neighboring pixels in 2N pixels, including said pixel of interest, that consist of N pixels on each side of the boundary between said block and another block and run orthogonally to said boundary, where N is a positive integer; the same applies to the following description;

the determination step of comparing said differences obtained at said difference calculation step with a threshold corresponding to said maximum value to determine whether filtering should be performed; and the filtering step of performing filtering by using said pixel of interest and each set of M pixels on each side of said pixel of interest if said determination step determines that filtering should be performed, where M is a positive integer smaller than N; the same applies to the following description).

41. The image processing method according to claim 40, characterized in that said difference calculation step calculates differences between neighboring pixels in 2N pixels referenced; and said determination step determines that said filtering should be performed if all the differences obtained at said difference calculation step are smaller than said threshold.

42. The image processing method according to claim 40, characterized in that said difference calculation step calculates differences between neighboring pixels in the 2N pixels referenced, said neighboring pixels being at least one pixel apart from each other, and, if all of the differences obtained at said difference calculation step are smaller than a threshold that is determined based on a quantized value for the image, said determination step determines that said filtering should be performed.

43. The image processing method according to claim 40, characterized in that said determination step determines that predetermined filtering differing from said filtering should be performed if all of said differences are not smaller than said threshold and a difference between neighboring pixels in said M pixels is smaller than a predetermined threshold.

44. The image processing method according to claim 40, characterized in that said determination step determines said threshold according to said maximum value.

45. The image processing method according to claim 40, characterized in that said determination step sets a higher threshold for pixels at a boundary of the block to be processed than a threshold for pixels within the block to be processed.

46. The image processing method according to claim 40, characterized in that said filtering step makes correction to said pixel of interest according to a value obtained by multiplying said pixel of interest and each of a plurality of pixels on each side of said pixel of interest by one of predetermined coefficients and dividing the product by the sum of said coefficients.

47. The image processing method according to claim 40, characterized in that said maximum value finding step searches pixels to be searched on every other line for said maximum value.

48. The image processing method according to claim 40, characterized in that filtering is performed on one of a horizontal line and a vertical line in said block to which filtering is applied and thereafter filtering is performed on the other of the horizontal line and the vertical line.

49. The image processing method according to claim 40, characterized in that the image processing method comprises:

the tentative-maximum-value obtaining step of storing each set of four pixels on each side of each of said horizontal and vertical boundaries, said each set of four pixels running from the intersection of said horizontal and vertical boundaries and calculating differences between said neighboring pixels in 8×8 pixels stored to obtain a tentative maximum value that is the maximum value of said differences between pixels in each set of 4×4 pixels separated by said boundary;

wherein the maximum one of all tentative maximum values in said block is determined as said maximum value at said maximum value finding step if said tentative maximum values in the entire block have already been obtained, or the maximum one of tentative maximum values obtained is determined as said maximum value if not all of said tentative maximum values in the entire block have been obtained; and said difference calculation step and said filtering step process the stored 8×8 pixels.

50. The image processing method according to claim 40, characterized in that the image processing method comprises:

the tentative-maximum-value obtaining step of storing each set of four pixels on each side of said vertical boundary and four pixels located above said horizontal boundary and eight pixels located below said horizontal boundary running from the intersection of said horizontal and vertical boundaries and calculating differences between said neighboring pixels in 8×12 pixels stored to obtain a tentative maximum value that is the maximum one of differences between pixels in a set of 4×4 pixels, said set being a unit provided by dividing said 8×12 pixels into two rows and three lines;

wherein said maximum value finding step determines as said maximum value the maximum one of all tentative maximum values in the block if tentative maximum values in the entire block have already been obtained, or determines as said maximum value the maximum one of tentative maximum values obtained if not all of said tentative maximum values in the entire block have been obtained; and said difference calculation step and said filtering step process the upper 8×8 pixels in the stored 8×12 pixels.

51. An image processing program for performing filtering on pixels belonging to a block which is a unit of discrete cosine transform in image compression, characterized by comprising:

the maximum value finding step of finding the maximum value of differences between neighboring pixels in at least half of all pixels composing a block to be processed, said half including a pixel of interest;

the difference calculation step of calculating differences between neighboring pixels in 2N pixels, including said pixel of interest, that consist of N pixels on each side of the boundary between said block and another block and run orthogonally to said boundary, where N is a positive integer; the same applies to the following description;

the determination step of comparing said differences obtained at said difference calculation step with a threshold corresponding to said maximum value to determine whether filtering should be performed; and the filtering step of performing filtering by using said pixel of interest and each set of M pixels on each side of said pixel of interest if said determination step determines that filtering should be performed, where M is a positive integer smaller than N; the same applies to the following description.

52. The image processing program according to claim 51, characterized in that said difference calculation step calculates differences between neighboring pixels in 2N pixels referenced; and said determination step determines that said filtering should be performed if all the differences obtained at said difference calculation step are smaller than said threshold.

53. The image processing program according to claim 51, characterized in that said difference calculation step calculates differences between neighboring pixels in the 2N pixels referenced, said neighboring pixels being at least one pixel apart from each other, and, if all of the differences obtained at said difference calculation step are smaller than a threshold that is determined based on a quantized value for the image, said determinatino step determines that said filtering should be performed.

54. The image processing program according to claim 51, characterized in that said determination step determines that predetermined filtering differing from said filtering should be performed if all of said differences are not smaller than said threshold and a difference between neighboring pixels in said M pixels is smaller than a predetermined threshold.

55. The image processing program according to claim 51, characterized in that said determination step determines said threshold according to said maximum value.

56. The image processing program according to claim 51, characterized in that said determination step sets a higher threshold for pixels at a boundary of the block to be processed than a threshold for pixels within the block to be processed.

57. The image processing program according to claim 51, characterized in that said filtering step makes correction to said pixel of interest according to a value obtained by multiplying said pixel of interest and each of a plurality of pixels on each side of said pixel of interest by one of predetermined coefficients and dividing the product by the sum of said coefficients.

58. The image processing program according to claim 51, characterized in that said maximum value finding step searches pixels to be searched on every other line for said maximum value.

59. The image processing program according to claim 51, characterized in that filtering is performed on one of a horizontal line and a vertical line in said block to which filtering is applied and thereafter filtering is performed on the other of the horizontal line and the vertical line.

60. The image processing program according to claim 51, characterized in that said image processing program comprises:

the tentative-maximum-value obtaining step of storing each set of four pixels on each side of each of said horizontal and vertical boundaries, said each set of four pixels running from the intersection of said horizontal and vertical boundaries and calculating differences between said neighboring pixels in 8×8 pixels stored to obtain a tentative maximum value that is the maximum value of said differences between pixels in each set of 4×4 pixels separated by said boundary;

in which the maximum one of all tentative maximum values in said block is determined as said maximum value at said maximum value finding step if said tentative maximum values in the entire block have already been obtained, or the maximum one of tentative maximum values obtained is determined as said maximum value if not all of said tentative maximum values in the entire block have been obtained; and said difference calculation step and said filtering step process the stored 8×8 pixels.

61. The image processing program according to claim 51, characterized by comprising:

the tentative-maximum-value obtaining step of storing each set of four pixels on each side of said vertical boundary and four pixels located above said horizontal boundary and eight pixels located below said horizontal boundary running from the intersection of said horizontal and vertical boundaries and calculating differences between said neighboring pixels in 8×12 pixels stored to obtain a tentative maximum value that is the maximum one of differences between pixels in a set of 4×4 pixels, said set being a unit provided by dividing said 8×12 pixels into two rows and three lines;

in which, said maximum value finding step determines as said maximum value the maximum one of all tentative maximum values in the block if tentative maximum values in the entire block have already been obtained, or determines as said maximum value the maximum one of tentative maximum values obtained if not all of said tentative maximum values in the entire block have been obtained; and said difference calculation step and said filtering step process the upper 8×8 pixels in the stored 8×12 pixels.

* * * * *